United States Patent
Kowalski et al.

(10) Patent No.: US 12,323,927 B2
(45) Date of Patent: Jun. 3, 2025

(54) POWER MANAGEMENT FOR INTEGRATED ACCESS AND BACKHAUL NETWORKS

(71) Applicant: SHARP KABUSHIKI KAISHA, Sakai (JP)

(72) Inventors: John Michael Kowalski, Vancouver, WA (US); Kazunari Yokomakura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 464 days.

(21) Appl. No.: 17/630,497

(22) PCT Filed: Jul. 27, 2020

(86) PCT No.: PCT/JP2020/028733
§ 371 (c)(1),
(2) Date: Jan. 26, 2022

(87) PCT Pub. No.: WO2021/020350
PCT Pub. Date: Feb. 4, 2021

(65) Prior Publication Data
US 2022/0330176 A1  Oct. 13, 2022

Related U.S. Application Data

(60) Provisional application No. 62/879,309, filed on Jul. 26, 2019.

(51) Int. Cl.
*H04W 52/24* (2009.01)
*H04W 52/36* (2009.01)
*H04W 88/08* (2009.01)

(52) U.S. Cl.
CPC ....... *H04W 52/367* (2013.01); *H04W 52/242* (2013.01); *H04W 52/243* (2013.01); *H04W 88/08* (2013.01)

(58) Field of Classification Search
CPC ............ H04W 52/367; H04W 52/242; H04W 52/243; H04W 88/08
See application file for complete search history.

(56) References Cited

U.S. PATENT DOCUMENTS

| 9,049,668 | B2* | 6/2015 | Tavildar | ............... H04W 52/46 |
| 10,470,136 | B1* | 11/2019 | Ghosh | ................ H04W 56/001 |
| 2019/0132805 | A1* | 5/2019 | Abedini | ............... H04L 5/0053 |

OTHER PUBLICATIONS

"3rd Generation Partnership Project; Technical Specification Group Radio Access Network; NR; User Equipment (UE) radio transmission and reception; Part 3: Range 1 and Range 2 Interworking operation with other radios(Release 16)", 3GPP TS 38.101-3 V16.0.0 (Jun. 2019).

(Continued)

*Primary Examiner* — Dai Phuong
(74) *Attorney, Agent, or Firm* — ScienBiziP, P.C.

(57) ABSTRACT

In one of the example aspects, the technology disclosed herein concerns an Integrated Access and Backhaul (IAB) node that communicates over a radio interface. The IAB node includes mobile-termination circuitry, distributed unit circuitry, and processor circuitry. The mobile-termination circuitry is configured to transmit over the radio interface with a parent node. The distributed unit circuitry is configured to transmit over the radio interface with a child node. The processor circuitry is configured to manage the transmission power utilized by the IAB node by taking into consideration both transmission by the mobile-termination circuitry and transmission by the distributed unit circuitry. Other example aspects of the technology disclosed herein concern the transmission power reporting by such IAB node, (Continued)

transmission power prioritization by such IAB node, transmission power governance for the distributed unit circuitry for such IAB node, and a method of operating such IAB node(s).

2 Claims, 13 Drawing Sheets

(56) References Cited

OTHER PUBLICATIONS

"3rd Generation Partnership Project; Technical Specification Group Radio Access Network; NR; User Equipment (UE) radio transmission and reception; Part 2: Range 2 Standalone(Release 16)", 3GPP TS 38.101-2 V16.0.0 (Jun. 2019).
"3rd Generation Partnership Project; Technical Specification Group Radio Access Network; NR; Medium Access Control (MAC) protocol specification(Release 15)", 3GPP TS 38.321 V15.6.0 (Jun. 2019).
"3rd Generation Partnership Project; Technical Specification Group Radio Access Network; Evolved Universal Terrestrial Radio Access (E-UTRA); Multiplexing and channel coding(Release 15)", 3GPP TS 36.212 V15.6.0 (Jun. 2019).
"3rd Generation Partnership Project; Technical Specification Group Radio Access Network; NR; Physical layer procedures for data(Release 15)", 3GPP TS 38.214 V15.6.0 (Jun. 2019).
"3rd Generation Partnership Project; Technical Specification Group Radio Access Network; NR; Radio Resource Control (RRC) protocol specification(Release 15)", 3GPP TS 38.331 V15.6.0 (Jun. 2019).
"3rd Generation Partnership Project; Technical Specification Group Radio Access Network; NR; Physical layer measurements(Release 15)", 3GPP TS 38.215 V15.5.0 (Jun. 2019).
"3rd Generation Partnership Project; Technical Specification Group Radio Access Network; NR; Physical channels and modulation(Release 15)", 3GPP TS 38.211 V15.6.0 (Jun. 2019).
"3rd Generation Partnership Project; Technical Specification Group Radio Access Network; NR; Multiplexing and channel coding(Release 15)", 3GPP TS 38.212 V15.6.0 (Jun. 2019).
"3rd Generation Partnership Project; Technical Specification Group Radio Access Network; NR; User Equipment (UE) radio transmission and reception; Part 1: Range 1 Standalone(Release 16)", 3GPP TS 38.101-1 V16.0.0 (Jun. 2019).
"3rd Generation Partnership Project; Technical Specification Group Radio Access Network; NR; Physical layer procedures for control(Release 15)", 3GPP TS 38.213 V15.6.0 (Jun. 2019).
"3rd Generation Partnership Project; Technical Specification Group Radio Access Network; NG-RAN; Architecture description(Release 15)", 3GPP TS 38.401 V15.6.0 (Jul. 2019).
"3rd Generation Partnership Project; Technical Specification Group Radio Access Network; NR; NR and NG-RAN Overall Description; Stage 2(Release 15)", 3GPP TS 38.300 V15.6.0 (Jun. 2019).
Qualcomm Incorporated, "Enhancements to support NR backhaul links", R1-1811256, 3GPP TSG RAN WG1 Meeting #94b, Chengdu, China, Oct. 8-Oct. 12, 2018.

\* cited by examiner

POWER MANAGEMENT FOR INTEGRATED ACCESS AND BACKHAUL NETWORKS

TECHNICAL FIELD

The technology relates to wireless communications, and particularly to power management for Integrated Access and Backhaul (IAB) networks.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNodeB" or "eNB"), a home eNB ("HeNB"), a "gNodeB" or "gNB" for a New Radio ["NR"] technology system, or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In 3rd Generation Partnership Project (3GPP), the relay node concept for the fifth generation (5G) cellular system has been discussed and standardized, where the relay nodes may utilize the same 5G radio access technologies (e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes; and additionally, an IAB-node may provide IAB functionality combined with wireless self-backhauling capabilities.

A Donor IAB Node is a node that provides access of core network/backhaul/radio resource control functionality to the IAB network. A Donor IAB node may comprise a CU, e.g., a "Central Unit," or more properly, a gNB-CU, and a distributed unit, e.g., DU. The central unit CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU" according to 3GPP TS38.401.

A non-Donor IAB node may either be a relay IAB node or a client device, e.g., a wireless terminal or UE. A relay IAB mode may comprise a mobile termination unit, MT, and a distributed unit, DU. An IAB node that is a wireless terminal or mobile device may comprise transceiver circuitry, e.g., a transmitter and received, and processor circuitry.

Power management for a wireless terminal such as a UE has obvious importance since wireless terminals are typically battery powered. Power management can also be an issue for base stations including IAB nodes, even though base stations tend to be connected to a power grid most of the time rather than being battery operated. But base stations may be battery operated at least some of the time, for example should there be a massive power outage. Base stations benefit from power management for yet other reasons, such as spectral regulations concerning (frequency) sidelobe emissions. Moreover, there is the potential that 5G networks overall may consume significantly greater energy than LTE networks, particularly a 5G network with many small cells and if beamforming equipment is utilized.

What is needed are methods, apparatus, and/or techniques which involve or facilitate power management for Integrated Access and Backhaul (IAB) nodes.

SUMMARY OF INVENTION

In one example, an Integrated Access and Backhaul (IAB) node that communicates over a radio interface, the IAB node comprising: mobile-termination circuitry configured to transmit over the radio interface with a parent node; distributed unit circuitry configured to transmit over the radio interface with a child node; processor circuitry configured to manage transmission power utilized by the IAB node by taking into consideration both transmission by the mobile-termination circuitry and transmission by the distributed unit circuitry.

In one example, a method in an Integrated Access and Backhaul (IAB) node that communicates over a radio interface, the method node comprising: using mobile-termination circuitry to transmit over the radio interface with a parent node; using distributed unit circuitry to transmit over the radio interface with a child node; managing transmission power utilized by the IAB node by taking into consideration both transmission by the mobile-termination circuitry and transmission by the distributed unit circuitry.

In one example, a donor Integrated Access and Backhaul (IAB) node in an Integrated Access and Backhaul (IAB) network, the donor IAB node comprising: processor circuitry configured to designate one or more IAB nodes of the Integrated Access and Backhaul (IAB) network as a power regulation IAB node which is permitted to perform power management of power transmissions of a child node of the power regulation IAB node; transmitter circuitry configured to transmit a power regulation IAB node designation to the power regulation IAB node.

In one example, a method in a donor Integrated Access and Backhaul (IAB) node in an Integrated Access and Backhaul (IAB) network, the method comprising: designating one or more IAB nodes of the Integrated Access and Backhaul (IAB) network as a power regulation IAB node which is permitted to perform power management of power transmissions of a child node of the power regulation IAB node; transmitting a power regulation IAB node designation to the power regulation IAB node.

In one example, an Integrated Access and Backhaul (JAB) node of an Integrated Access and Backhaul (IAB) network, the IAB node comprising: processor circuitry configured to generate, for each of plural child IAB nodes, a maximum transmission power for distributed unit circuitry comprising the plural child IAB nodes, the maximum transmission power being configured in consideration of cross-link interference between the plural child IAB nodes; transmitter circuitry configured to transmit an indication of the maximum transmission power to the plural child IAB nodes.

In one example, a method in an Integrated Access and Backhaul (IAB) node of an Integrated Access and Backhaul (IAB) network, the method comprising: generating, for each of plural child IAB nodes, a maximum transmission power for distributed unit circuitry comprising the plural child IAB nodes, the maximum transmission power being configured in consideration of cross-link interference between the plural child IAB nodes; transmitting an indication of the maximum transmission power to the plural child IAB nodes.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1:
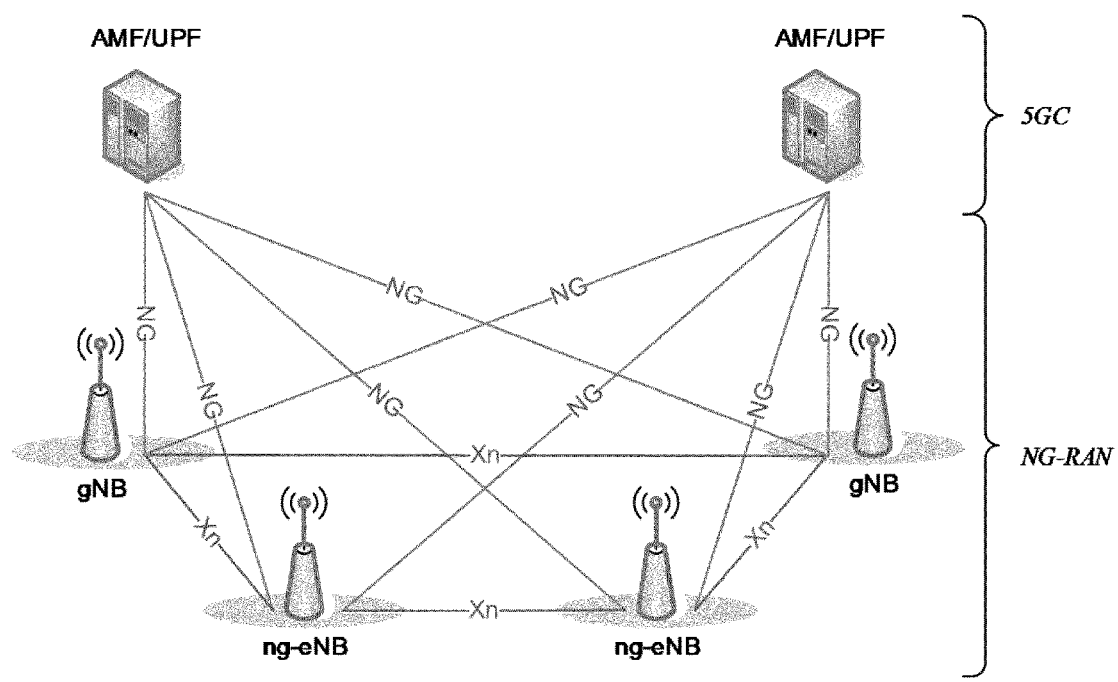
FIG. 1 is a diagrammatic view of overall architecture for a 5G New Radio system.

In one of its example aspects the technology disclosed herein concerns an Integrated Access and Backhaul (IAB) node that communicates over a radio interface. The IAB node comprises mobile-termination circuitry, distributed unit circuitry, and processor circuitry. The mobile-termination circuitry is configured to transmit over the radio interface with a parent node. The distributed unit circuitry is configured to transmit over the radio interface with a child node. The processor circuitry is configured to manage transmission power utilized by the IAB node by taking into consideration both transmission by the mobile-termination circuitry and transmission by the distributed unit circuitry. Other example aspects of the technology disclosed herein concern transmission power reporting by such IAB node, transmission power prioritization by such JAB node; transmission power governance for the distributed unit circuitry for such IAB node; and method of operating such IAB node(s).

In another of its example aspects the technology disclosed herein concerns a donor IAB node which is configured to select an IAB node to serve as a principal parent or family power management IAB node, and methods of operation of such nodes.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B or "NB", an enhanced Node B or eNodeB or eNB, a home eNB ("HeNB"), a gnodeB or gNB for a New Radio ["NR"] technology system, and Integrated Access and Backhaul (IAB) node, or some other similar terminology.

As used herein, the term "telecommunication system" or "communications system" can refer to any network of devices used to transmit information. A non-limiting example of a telecommunication system is a cellular network or other wireless communication system. Furthermore, the "node" may comprise a portion of a gNB's architecture, in particular, a gNB-DU (gNB Distributed Unit), which would be a logical node hosting RLC, MAC and PHY layers of the gNB, under the control of a gNB-CU (gNB Central Unit), which would reside in a "donor node," and hosting RRC, SDAP and PDCP protocols of the gNB or RRC and PDCP protocols of the en-gNB that controls the operation of one or more gNB-DUs.

As used herein, the term "cellular network" or "cellular radio access network" can refer to a network distributed over cells, each cell served by at least one fixed-location transceiver, such as a base station. It should also be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources.

A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Any reference to a "resource" herein means "radio resource" unless otherwise clear from the context that another meaning is intended. In general, as used herein a radio resource ("resource") is a time-frequency unit that can carry information across a radio interface, e.g., either signal information or data information. An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a sub-carrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix.

Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of 21 slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference. A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small sub-networks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

A. Generic Architecture Description

Figure 2:
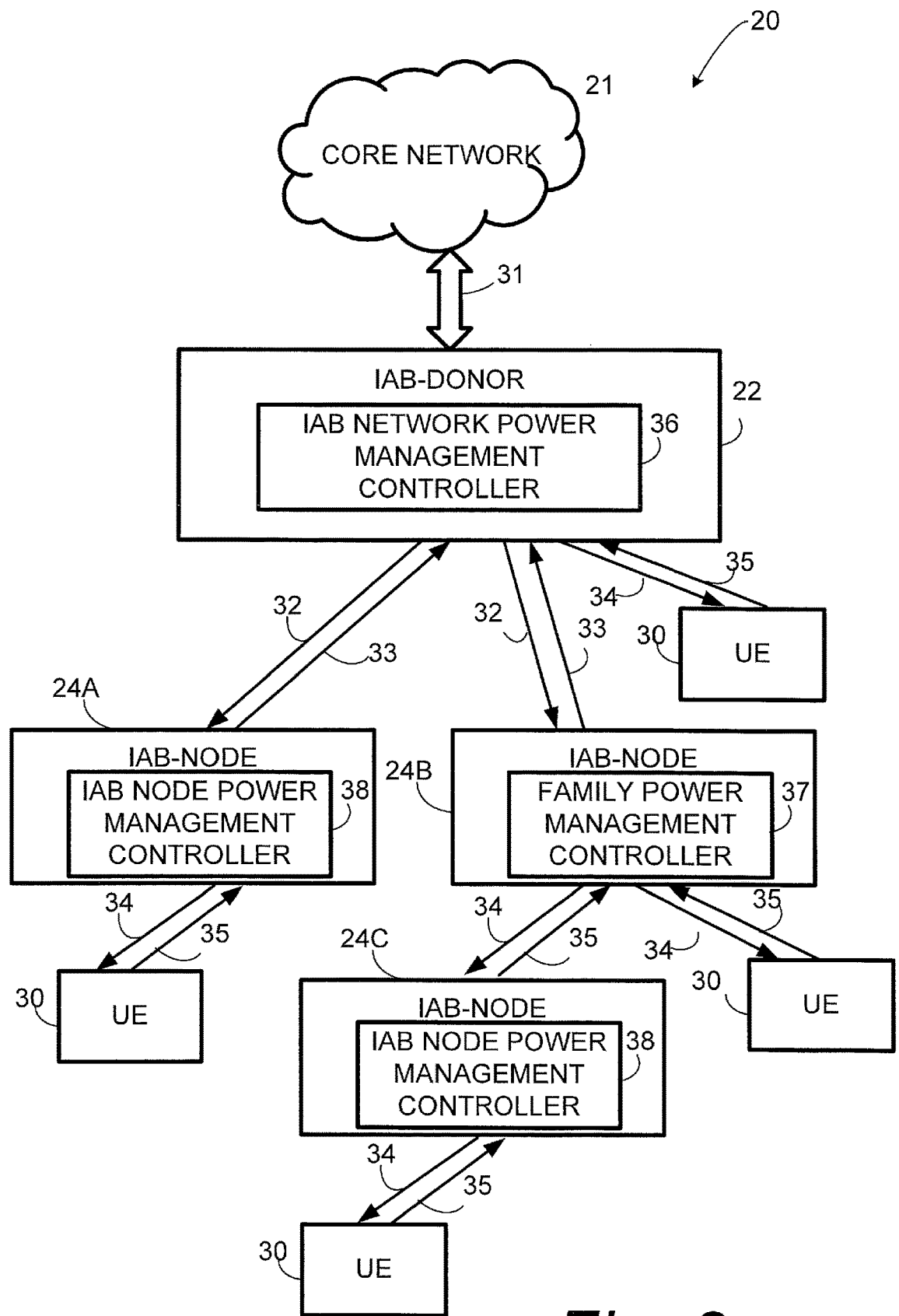
FIG. 2 is a diagrammatic view illustrating a mobile network infrastructure using 5G signals and 5G base stations, and particularly showing a donor IAB node comprising an IAB network power management controller and plural IAB nodes each comprising an IAB resource configuration manager.

FIG. 2 shows an example telecommunications system 20 comprising core network 21 and plural wireless access nodes including donor IAB node 22 and other IAB nodes 24, e.g., IAB nodes 24A, 24B, and 24C, which are not donor IAB nodes; and plural user equipments (UE) 30 that are served by one or more of the access nodes. FIG. 2 further shows that the donor IAB node 22 may be connected to core network 21, e.g., by a wireline 31 or other suitable connection; and that wireless access links may connect the donor IAB node 22, the IAB nodes 24, and the user equipments (UEs) 30. FIG. 2 particularly shows, for example, that donor TAB node 22 is connected by downlink donor backhaul link 32 and uplink donor backhaul link 33 to one or more IAB nodes 24. FIG. 2 further shows that an IAB node 24 may be connected by downlink backhaul link 34 and uplink backhaul link 35 to one or more child nodes, e.g., to a user equipment (UE) 30 or to another IAB node 24. It should be understood that some parts of operations and behaviors that are performed by the donor IAB node may be able to be performed by a parent IAB node.

With reference to FIG. 2, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, some of the IAB nodes may be referred to as IAB relay nodes. The IAB-node may be a Radio Access Network (RAN) node that supports wireless access to UEs and wirelessly backhauls the access traffic. The IAB-donor may be a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 2, plural UEs 30 are depicted as in communication with IAB nodes, for example, IAB nodes 24 and IAB donor node 22, via wireless access link(s). Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

Figure 3:
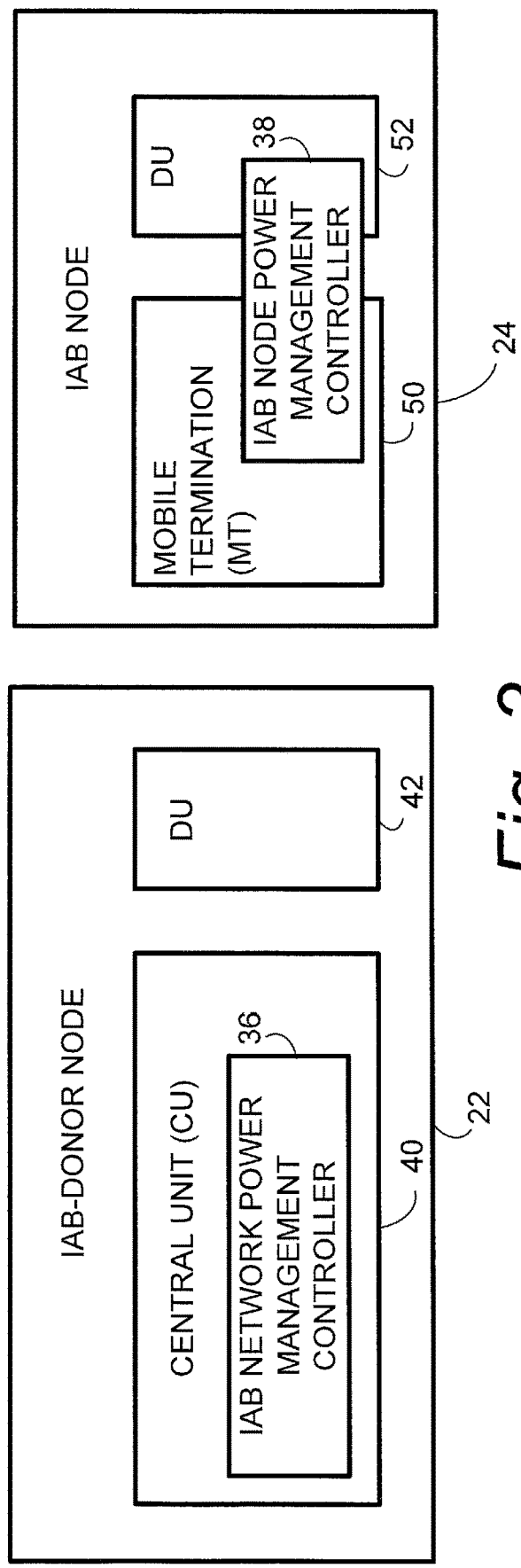
FIG. 3 is a diagrammatic view depicting an example of functional block diagrams for donor IAB node and a representative IAB node of FIG. 2.

The technology disclosed herein provides power management for Integrated Access and Backhaul (IAB) networks. Power management for Integrated Access and Backhaul (IAB) networks is considerably more complicated than conventional power management for wireless terminals. Power management for Integrated Access and Backhaul (IAB) networks is complicated by the fact that, as shown in FIG. 3, an IAB node includes not only a mobile termination entity such as Mobile-Termination (MT) 50, which may function as a user equipment, but also a Distributed Unit (DU) 52. As used herein, the Mobile-Termination (MT) 50 may also be referred to as mobile-termination circuitry, and Distributed Unit (DU) 52 may also be referred to as distributed unit circuitry. The Mobile-Termination (MT) 50 and Distributed Unit (DU) 52 may transmit simultaneously, and such simultaneous transmission has power management implications. Moreover, in some example embodiments and modes, the IAB node 24 may comprise plural Mobile-Terminations (MT) 50, which adds a further dimension to the power management operation.

FIG. 2 further shows that, as one example aspect of the technology disclosed herein, donor IAB node 22 may comprise IAB network power management controller 36. One example purpose of IAB network power management controller 36 may be to select one or more IAB nodes to serve as a "principal parent" or family power management IAB nodes. For example, the IAB network power management controller 36 of donor IAB node 22 may select IAB node 24B to be a family power management IAB node, as evidenced by the fact that IAB node 24B comprises family power management controller 37. A node which is designated as a family power management IAB node is responsible for regulating the power transmitted by its child IAB nodes. For example, the IAB node 24B of FIG. 2, designated as a family power management IAB node, regulates the power transmission of not only wireless terminals served by IAB node 24B, but also the power transmission of IAB node 24C and wireless terminals served by IAB node 24C. The donor IAB node 22 may also designated itself as a family power management IAB node for regulating power transmission of IAB node 24A and wireless terminals served by IAB node 24A, as well as for regulating power transmission of IAB node 24B and wireless terminals served by IAB node 24B.

FIG. 2 further shows that, as another example aspect of the technology disclosed herein, one or more IAB nodes 24 may comprise IAB node power management controller 38. In some example embodiments and modes, the IAB network power management controller 36 of donor IAB node 22 may work together with the IAB node power management controller(s) 38, but in other example embodiments and modes, the IAB node power management controller(s) 38 may be provided independently from and thus form a distinctly separate innovation apart from IAB network power management controller 36.

Example embodiments and modes featuring one or both of IAB network power management controller 36 and IAB node power management controller 38 facilitate enhanced and more efficient power management of the Integrated Access and Backhaul (IAB) telecommunications system 20. As such, the technology disclosed herein provides power control and power management considerably beyond the conventional power management for wireless terminals, and takes into consideration aspects and problems of Integrated Access and Backhaul (IAB) nodes.

FIG. 3 depicts an example of functional block diagrams for the donor JAB node 22 and the IAB node 24 (see FIG. 2). The donor IAB node 22 may comprise at least one Central Unit (CU) 40 and at least one Distributed Unit (DU) 42. The Central Unit (CU) 40 is a logical entity managing the DU collocated in the donor IAB node 22 as well as the remote DUs resident in the IAB-nodes. The Central Unit (CU) 40 may also be an interface to the core network 21, behaving as a RAN base station (e.g., eNB or gNB).

In some embodiments, the Distributed Unit (DU) 42 is a logical entity hosting a radio interface (backhaul/access) for other child IAB-nodes and/or UEs. In one configuration, under the control of Central Unit (CU) 40, the Distributed Unit (DU) 42 may offer a physical layer and Layer-2 (L2) protocols, e.g., Medium Access Control (MAC), Radio Link Control (RLC), etc., while the Central Unit (CU) 40 may manage upper layer protocols, such as Packet Data Convergence Protocol (PDCP), Radio Resource Control (RRC), etc. As shown in FIG. 3, the Central Unit (CU) 40 may host or comprise the IAB network power management controller 36, as hereinafter discussed.

As also shown in FIG. 3, an IAB node 24 may comprise Mobile-Termination (MT) 50 and Distributed Unit (DU) 52. In some example embodiments the Distributed Unit (DU) 52 may have the same functionality as the Distributed Unit (DU) 42 in the IAB-donor, whereas the Mobile-Termination (MT) 50 may be a UE-like function that terminates the radio interface layers. As an example, the Mobile-Termination (MT) 50 may function to perform at least one of: radio transmission and reception, encoding and decoding, error detection and correction, signaling, and access to a SIM. Either or both of the Mobile-Termination (MT) 50 and Distributed Unit (DU) 52 may comprise or host the IAB resource configuration manager 38.

The DU may have all or parts of functions of an access node or gNB in FIG. 1 and an MT may have all or parts of functions of a UE. In other words, an access node or gNodeB may be rephrased by a CU and a DU, and the UE may be rephrased as a MT.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP*) which is a wireless backhaul protocol that provides signaling services between the DU of an IAB-node and the CU of an IAB-donor. That is, the protocol stack configuration may be interchangeable, and different mechanism may be used.

In some aspects and or example embodiments and modes, a Mobile Termination (MT) functionality—typically provided by the User Equipment (UE) terminals—may be implemented by Base Transceiver Stations (BTSs or BSs) nodes, for example, IAB nodes. In one embodiment, the MT functions may comprise common functions such as: radio transmission and reception, encoding and decoding, error detection and correction, signaling, and access to a SIM.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

Figure 4:
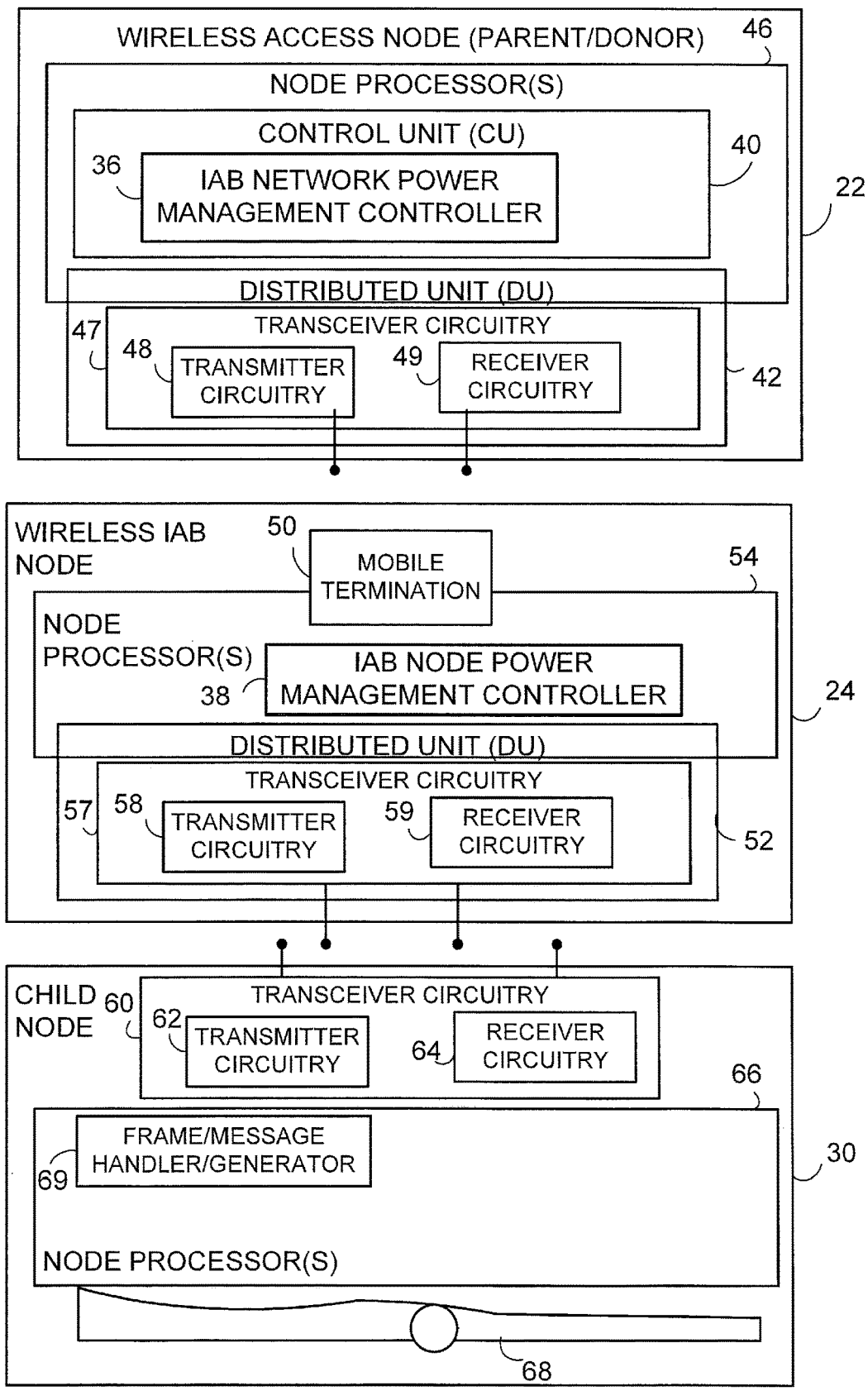
FIG. 4 is a schematic view of an example generic communication system comprising an Integrated Access and Backhaul (IAB) network which may serve as context for example embodiments and modes described herein.

FIG. 4 shows in more detail a generic example embodiment and mode of arrangement and composition of certain functionalities and components of donor IAB node 22; an example, representative IAB node 24; and an example, representative user equipment (UE) 30. It should be understood that each of the nodes of FIG. 4 comprise additional components and functionalities known to the person skilled in the art, and that primarily those pertinent to the technology disclosed herein are illustrated for sake of simplicity.

As understood from the foregoing, FIG. 4 shows that donor IAB node 22 comprises central unit (CU) 40 and distributed unit (DU) 42. The central unit (CU) 40 and distributed unit (DU) 42 may be realized by, e.g., be comprised of or include, one or more processor circuits, e.g., donor node processor(s) 46. The one or more node processor(s) 46 may be shared by central unit (CU) 40 and distributed unit (DU) 42, or each of central unit (CU) 40 and distributed unit (DU) 42 may comprise one or more node processor(s) 46. The IAB network power management controller 36 may be comprised or realized by donor node processor(s) 46. Central unit (CU) 40 and distributed unit (DU) 42 may be co-located at a same node site, or alternatively one or more distributed units may be located at sites remote from central unit (CU) 40 and connected thereto by a packet network. The distributed unit (DU) 42 of donor IAB node 22 may comprise transceiver circuitry 47, which in turn may comprise transmitter circuitry 48 and receiver circuitry 49. The transceiver circuitry 47 includes antenna(e) for the wireless transmission. Transmitter circuitry 48 includes, e.g., amplifier(s), modulation circuitry and other conventional transmission equipment. Receiver circuitry 49 comprises, e.g., amplifiers, demodulation circuitry, and other conventional receiver equipment.

As shown in FIG. 4 the IAB-node 24, also known as wireless relay node 24, in an example embodiment and mode comprises the IAB node mobile termination (MT) unit 50 and IAB node distributed unit (DU) 52. The IAB node mobile termination (MT) unit 50 and IAB node distributed unit (DU) 52 may be realized by, e.g., by comprised of or include, one or more processor circuits, e.g., IAB node processor(s) 54. The one or more IAB node processor(s) 54 may be shared by IAB node mobile termination (MT) unit 50 and IAB node distributed unit (DU) 52, or each of IAB node mobile termination (MT) unit 50 and IAB node distributed unit (DU) 52 may comprise one or more IAB node processor(s) 54. The IAB node power management controller 38 may comprise or be realized by IAB node processor(s) 54. The IAB node distributed unit (DU) 52 may comprise IAB node transceiver circuitry 57, which in turn may comprise IAB node transmitter circuitry 58 and IAB node receiver circuitry 59. The IAB node transceiver circuitry 57 includes antenna(e) for the wireless transmission. IAB node transmitter circuitry 58 may include, e.g., amplifier(s), modulation circuitry and other conventional transmission equipment. IAB node receiver circuitry 59 may comprise, e.g., amplifiers, demodulation circuitry, and other conventional receiver equipment.

FIG. 4 shows child node 30, shown by way of example as user equipment (UE) 30, as comprising, in an example, non-limiting embodiment and mode, transceiver circuitry 60. The transceiver circuitry 60 in turn may comprise transmitter circuitry 62 and receiver circuitry 64. The transceiver circuitry 60 includes antenna(e) for the wireless transmission. Transmitter circuitry 62 may include, e.g., amplifier(s), modulation circuitry and other conventional transmission equipment. Receiver circuitry 64 may comprise, e.g., amplifiers, demodulation circuitry, and other conventional receiver equipment. FIG. 4 further shows child node 30, which (as indicated before) may be a user equipment or Integrated Access and Backhaul (IAB) node, as also comprising node processor circuitry, e.g., one or more node processor(s) 66, and interfaces 68, including one or more user interfaces. Such user interfaces may serve for both user input and output operations, and may comprise (for example) a screen such as a touch screen that can both display information to the user and receive information entered by the user. The user interface 68 may also include other types of devices, such as a speaker, a microphone, or a haptic feedback device, for example.

In an example, non-limiting embodiment and mode shown in FIG. 4, the child node 30 may include frame/message generator/handler 69. As is understood by those skilled in the art, in some telecommunications system messages, signals, and/or data are communicated over a radio or air interface using one or more "resources", e.g., "radio resource(s)". The frame/message generator/handler 69 serves to handle messages, signals, and data received from other nodes.

Various aspects of JAB networks and nodes, and in some cases the virtualization of such networks and nodes, are described in one or more of the following United States Patent Applications, all of which are incorporated herein by reference:

U.S. Provisional Patent Application 62/780,068, filed Dec. 14, 2018, entitled "METHODS AND APPARATUS FOR CELL BARRING IN WIRELESS RELAY NETWORKS".

U.S. Provisional Patent Application 62/753,699, filed Oct. 31, 2018, entitled "METHODS AND APPARATUS FOR USING CONDITIONAL HANDOVERS FOR WIRELESS";

U.S. Provisional Patent Application 62/758,020, filed Nov. 8, 2018, entitled "NETWORK AND METHODS TO SUPPORT INTERDOMAIN MOBILITY IN VIRTUALIZED RADIO ACCESS NETWORK";

U.S. Provisional Patent Application 62/748,359, filed Oct. 19, 2018, entitled "METHODS AND APPARATUS FOR CAPABILITY SIGNALING IN RADIO ACCESS NETWORK";

U.S. Provisional Patent Application 62/748,015, filed Oct. 19, 2018, entitled "RADIO ACCESS NETWORK AND METHODS FOR EXPEDITED NETWORK ACCESS".

U.S. Provisional Patent Application 62/790,922, filed Jan. 10, 2019, entitled "RESOURCE MANAGEMENT FOR WIRELESS BACKHAUL NETWORKS".

U.S. Provisional Patent Application 62/790,922, filed Mar. 28, 2019, entitled "RESOURCE MANAGEMENT FOR WIRELESS BACKHAUL NETWORKS".

U.S. Provisional Patent Application 62/872,636, filed Jul. 10, 2019, entitled "FLEXIBLE UTILIZATION OF COMMUNICATION RESOURCES TO SUPPORT BOTH ACCESS AND BACKHAUL".

B: Determination of Transmission Power for IAB Nodes

As mentioned above, in one of its example aspects the technology disclosed herein includes power management for an IAB node 24. In some example embodiments and modes, such power management may involve or utilize an IAB node power management controller such as IAB node power management controller 38 shown generally in FIG. 2.

Figure 5:
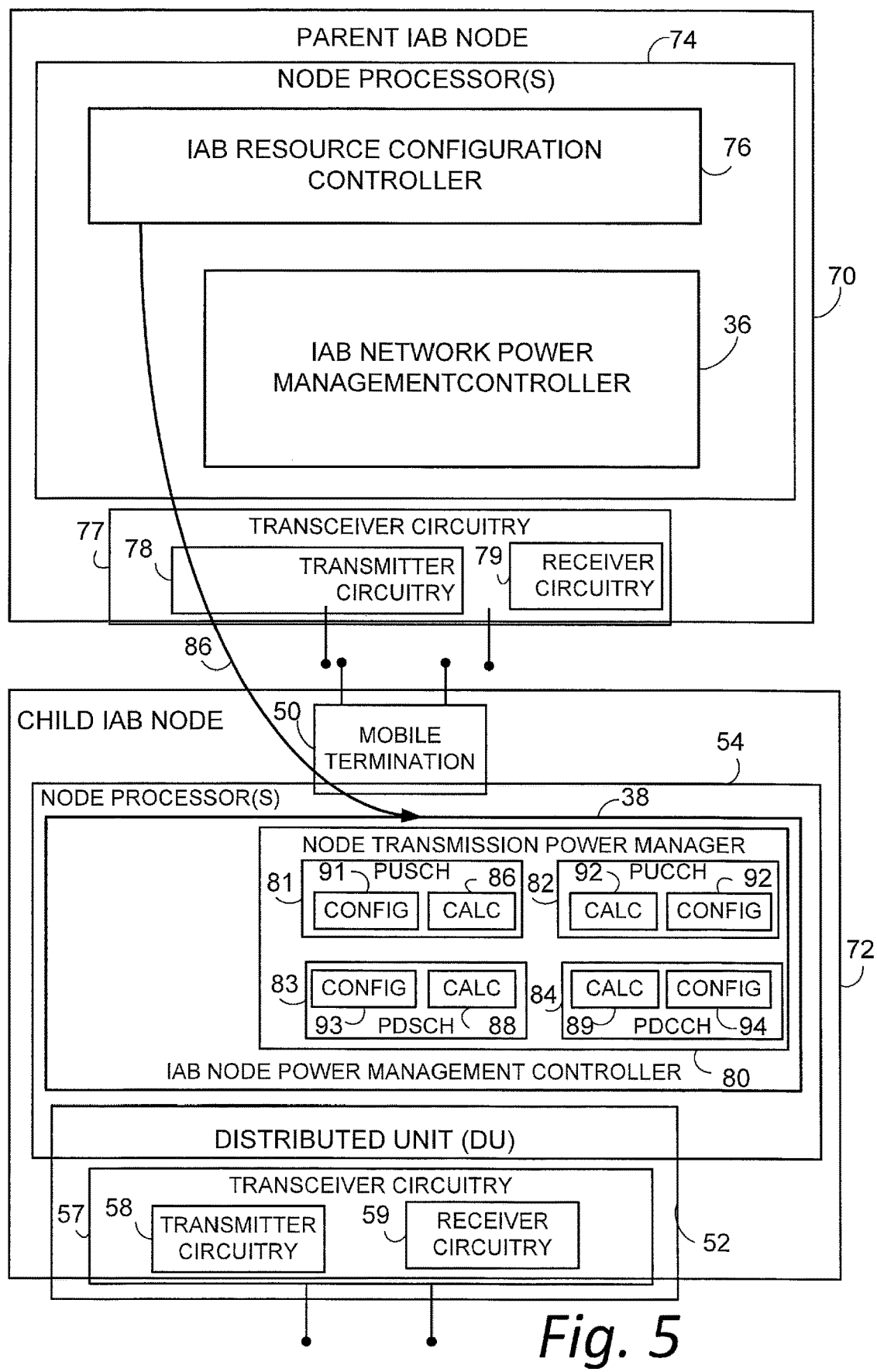
FIG. 5 is a schematic view of portions of an example communication system comprising an Integrated Access and Backhaul (IAB) network wherein transmission power utilization is determined for an IAB node.

As a generic example FIG. 5 shows a representative parent IAB node 70 and a representative child IAB node 72. The parent IAB node 70 may be a donor IAB node such as donor IAB node 22 shown in FIG. 3 and FIG. 4, or a non-donor IAB node which also functions as a parent, such as IAB nodes 24 of FIG. 2 and FIG. 4.

The parent IAB node 70 comprises parent node processor circuitry 74, which in turn may include or function as TAB resource configuration controller 76. The parent TAB node 70 further comprises parent node transceiver circuitry 77, which further may include transmitter circuitry 78 and receiver circuitry 79. In a first case that the parent IAB node 70 is a donor IAB node 22, the parent node processor circuitry 74 may comprise or function as Central Unit (CU) 40, and the transceiver circuitry 47 may comprise or be realized by Distributed Unit (DU) 42, essentially in the manner shown in FIG. 4. In a second case that the parent IAB node 70 is not a donor IAB node 22 but another IAB node which serves as a parent IAB node to a child IAB node, the parent node processor circuitry 74 may be shown by IAB node processor(s) 54 of IAB node 24 of FIG. 4, and the transceiver circuitry 47 may comprise or be realized by IAB node transceiver circuitry 57 essentially in the manner shown in FIG. 4. Regardless of whether the parent IAB node 70 is a donor IAB node 22 or an IAB node 24, the parent node processor circuitry 74 may comprise the family power management controller 37.

The child IAB node 72 of FIG. 5 may be essentially an IAB node 24 as shown in FIG. 4. As such, even with reference to FIG. 5, the child IAB node 72 may also be referred to as the IAB node 24. The child IAB node 72 like the IAB node 24 comprises Mobile-Termination (MT) 50 and Distributed Unit (DU) 52. One or more IAB node processor(s) 54 may serve to perform at least some functions of Mobile-Termination (MT) 50 and/or Distributed Unit (DU) 52. The IAB node processor(s) 54 may serve as the IAB node power management controller 38, as previously explained with reference to FIG. 4. Further, the Distributed Unit (DU) 52 may comprise IAB node transceiver circuitry 57, which in turn comprises IAB node transmitter circuitry 58 and IAB node receiver circuitry 59.

The child IAB node 72/IAB node 24 of FIG. 5 includes the IAB node processor(s) 54 and Mobile-Termination (MT) 50. In the example embodiment and mode of FIG. 5, the Mobile-Termination (MT) 50 includes receiver circuitry that receives the power management configuration information from the parent node, e.g., the parent IAB node 70. The radio resource configuration information may be received in a message such as radio resource configuration information message 86.

In the example embodiment and mode of FIG. 5, IAB node power management controller 38 comprises node transmission power manager 80. The node transmission power manager 80 serves to manage transmission power utilized by the IAB node by taking into consideration both transmission by the mobile-termination circuitry, e.g., Mobile-Termination (MT) 50, and transmission by the distributed unit circuitry, e.g., Distributed Unit (DU) 52. To do so, the node transmission power manager 80 comprises PUSCH power controller 81; PUCCH power controller 82; PDSCH power controller 83; and PDCCH power controller 84. Each of these power controllers includes transmission power determination or transmission power calculation functionality for determining or calculating the transmission power utilized on the respective channel by the respective unit, e.g., either Mobile-Termination (MT) 50 or Distributed Unit (DU) 52. For example, PUSCH power controller 81 includes PUSCH transmission power calculator 86; PUCCH power controller 82 includes PUCCH transmission power calculator 87; PDSCH power controller 83 includes PDSCH transmission power calculator 88; and, PDCCH power controller 84 includes PDCCH transmission power calculator 89.

In an example embodiment and mode, and as explained below, each of PUSCH transmission power calculator 86, PUCCH transmission power calculator 87, PDSCH transmission power calculator 88, and PDCCH transmission power calculator 89 may evaluate an expression or equation which is particular to the associated channel for making the respective calculation. In so doing, in an example implementation, each of the power calculators may utilize, for its associated respective channel, one or more of a configured maximum output power $P_{CMAX}$ and configured grant information, e.g., ConfiguredGrantConfig. For this reason, FIG.

5 also shows each of PUSCH power controller 81, PUCCH power controller 82, PDSCH power controller 83, and PDCCH power controller 84 as comprising a memory or register to store such configured information. In particular, FIG. 5 shows PUSCH power controller 81 as comprising PUSCH configuration register 91; PUCCH power controller 82 as comprising PUCCH configuration register 92; PDSCH power controller 83 as comprising PDSCH configuration register 93; and PDCCH power controller 84 as comprising PDCCH configuration register 94.

In an example, non-limiting embodiment and mode the PUSCH transmission power calculator 86 determines the PUSCH transmission power $P_{PUSCH,b,f,c}(i, j, q_d, l)$ in PUSCH transmission occasion i using Equation 1.

$$P_{PUSCH,b,f,c}(i, j, q_d, l) = \min \begin{Bmatrix} P_{CMAX,f,c}(i), \\ P_{O\_PUSCH,b,f,c}(j) + 10\log_{10} \\ (2^\mu \cdot M_{RB,b,f,c}^{PUSCH}(i)) + \\ \alpha_{b,f,c}(j) \cdot PL_{b,f,c}(q_d) + \\ \Delta_{TF,b,f,c}(i) + f_{b,f,c}(i, l) \end{Bmatrix} \quad \text{Equation 1}$$

For sake of nomenclauture, Equation 1 assumes that the Mobile-Termination (MT) 50 transmits a PUSCH on active UL BWP b of carrier f of serving cell c using parameter set configuration with index j and PUSCH power control adjustment state with index l. Equation 1 is understood with reference to it analogous employment for PUSCH for a UE, as explained in TS38.213, (V15.5.0) section 7.1, which is incorporated herein by reference in its entirety, as well as Table 1 which provides further explanation of terminology used in or pertinent to Equation 1. At this juncture it is noted that the PUSCH transmission power $P_{PuSCH,b,f,c}(i,j,q_d,l)$ may depend on $P_{CMAX,f,c}(i)$, which for the example embodiment and mode herein described is the Mobile-Termination (MT) 50 configured maximum output power for carrier f of serving cell c in PUSCH transmission occasion i. Thus the expression utilized by PUSCH transmission power calculator 86 for determining PUSCH transmission power by the Mobile-Termination (MT) 50 may be essentially the same as for determination of transmission power on PUSCH for a New Radio wireless terminal or UE.

In an example, non-limiting embodiment and mode the PDSCH transmission power calculator 88 may determine the PDSCH transmission power in analogous manner as PUSCH transmission power calculator 86 determines the PUSCH transmission power. That is, similar to Expression 1 utilized by PUSCH transmission power calculator 86, PDSCH transmission power calculator 88 may utilize a similar expression for transmitted PDSCH power from the DU 52 to its children. This equation utilized by PDSCH transmission power calculator 88 may be similar to the PUCCH Equation 1, however at least some parameters may be differently configurable. For example, PDSCH transmissions configured by *ConfiguredGrantConfig*, etc., and parameters associated with Configured Grants for power control may have similar parameters similar to those of PUSCH, but which differ by reason of being for DU PDSCH instead of MT PUSCH. Other parameters may have to be adjusted, where necessary, because of assumed differences in DU and MT link budgets and transmitted powers. The determination for which parameters may be used may be based on RRC configuration, for example for Configured Grant, but can also be made on the basis of whether or not there are specific quality of service, QoS, or reliability requirements associated with the PDSCH resources to be used. In general these parameters will be set by higher layers at the discretion of the network administration & operation.

In an example, non-limiting embodiment and mode the PUCCH transmission power calculator 87 determines the PUCCH transmission power $P_{PUCCH,b,f,c}(i,q_u,q_d,l)$ in PUCCH transmission occasion i using Equation 2.

$$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10} \\ (2^\mu \cdot M_{RB,b,f,c}^{PUCCH}(i)) + \\ PL_{b,f,c}(q_d) + \Delta_{F\_PUCCH}(F) + \\ \Delta_{TF,b,f,c}(i) + g_{b,f,c}(i, l) \end{Bmatrix} \quad \text{Equation 2}$$

For sake of nomenclauture, Equation 2 assumes that the Mobile-Termination (MT) 50 transmits a PUCCH on active UL BWP b of carrier f in the primary cell c using PUCCH power control adjustment state with index l. Equation 2 is understood with reference to it analogous employment for PUSCH for a UE, as explained in TS38.213, (V15.5.0) section 7.2.1, which is incorporated herein by reference in its entirety, as well as Table 2 which provides further explanation of terminology used in or pertinent to Equation 2. At this juncture it is noted that the PUCCH transmission power $P_{PUCCHb,f,c}(i, q_u,q_d,l)$ may depend on $P_{CMAX,f,c}(i)$ which for the example embodiment and mode herein described is the Mobile-Termination (MT) 50 configured maximum output power for carrier f of serving cell c in PUCCH transmission occasion i. Thus the expression utilized by PUCCH transmission power calculator 87 for determining PUSCH transmission power by the Mobile-Termination (MT) 50 may be essentially the same as for determination of transmission power on PUCCH for a New Radio wireless terminal or UE.

In an example, non-limiting embodiment and mode the PDCCH transmission power calculator 89 may determine the PDCCH transmission power in analogous manner as PUCCH transmission power calculator 87 determines the PUCCH transmission power. That is, similar to Expression 2 utilized by PUCCH transmission power calculator 87, PDCCH transmission power calculator 89 may utilize a similar expression for transmitted PDCCH power from the DU 52 to its children. This equation utilized by PDCCH transmission power calculator 89 may be similar to the PDCCH Equation 2, however at least some parameters may be differently configurable. For example, PDCCH transmissions configured by *ConfiguredGrantConfig*, etc., and parameters associated with Configured Grants for power control may have similar parameters similar to those of PUCCH, but which differ by reason of being for DU PDCCH instead of MT PUCCH. Other parameters may have to be adjusted, where necessary, because of assumed differences in DU and MT link budgets and transmitted powers. In an analogous manner as the PDSCH; configuration may be performed by higher layers. Moreover, PDCCH resources that must be transmitted with higher reliability, as PDCCH transmissions configured via Configured Grant would be as well as other high reliability transmissions.

Thus in the example embodiment and mode of FIG. 5 an IAB node 24 is provided with processor circuitry, e.g., IAB node processor(s) 54, which is configured to determine transmission power utilization of the IAB node by determining each of:

(1) power utilization by the mobile-termination circuitry for transmission on a Physical Uplink Shared Channel (PUSCH), as determined by PUSCH power controller 81;

(2) power utilization by the mobile-termination circuitry for transmission on a Physical Uplink Control Channel (PUCCH), as determined by PUCCH power controller 82;

(3) power utilization by the distributed unit circuitry for transmission on a Physical Downlink Shared Channel (PDSCH); as determined by PDSCH power controller 83; and (4) power utilization by the distributed unit circuitry for transmission on a Physical Downlink Control Channel (PDCCH), as determined by PDCCH power controller 84.

The total transmission power utilization may be a sum of each of these four transmission power components.

C: Reporting of Transmission Power for IAB Nodes

Figure 6:
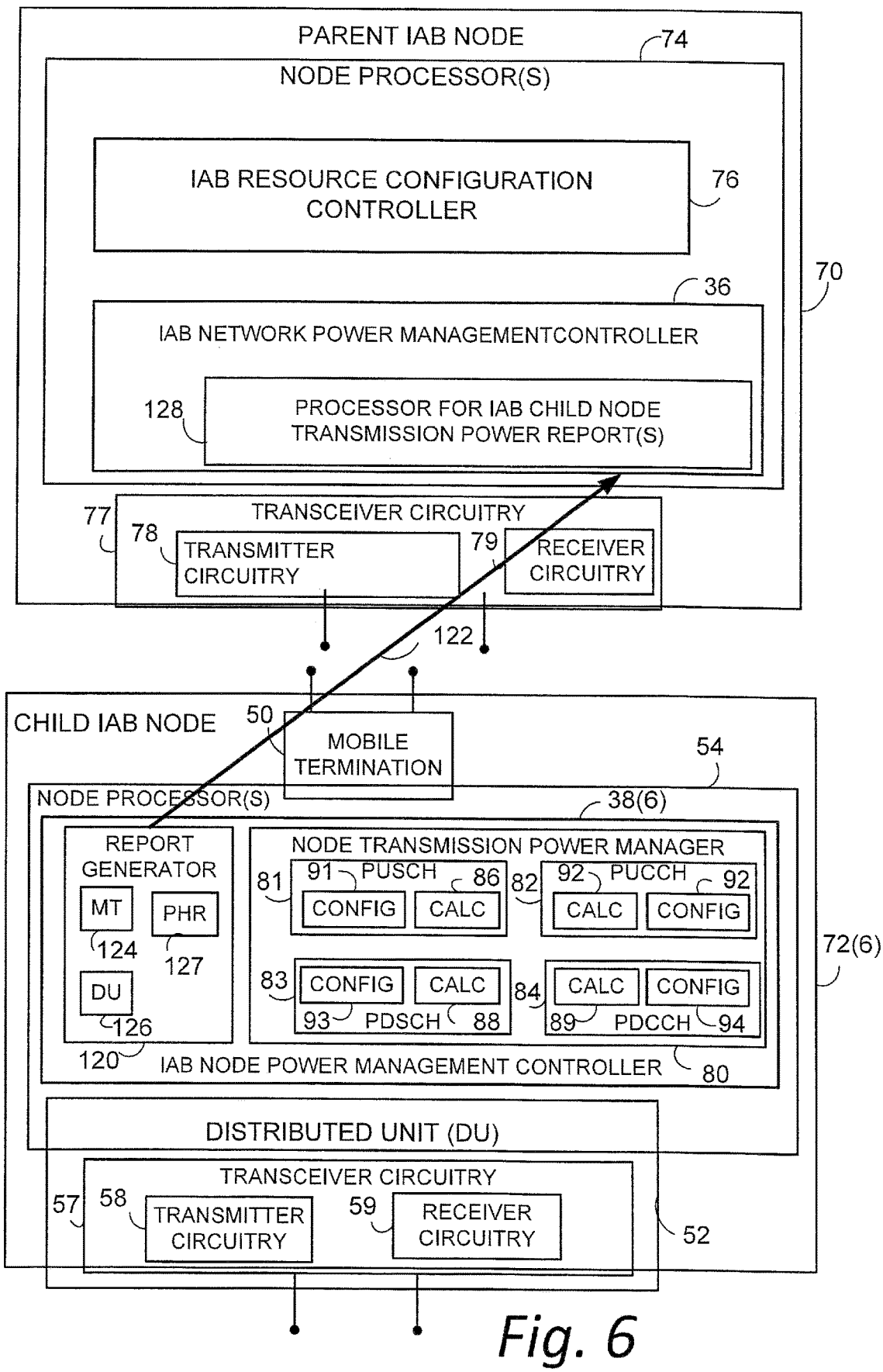
FIG. 6 is a schematic view of portions of an example communication system comprising an Integrated Access and Backhaul (JAB) network wherein an JAB node performs transmission power reporting, e.g., transmission power utilization reporting and/or transmission power transmission power headroom (PHR) reporting.

FIG. 6 illustrates another example embodiment of an IAB network showing child IAB node 72(6) with a transmission power reporting capability. Nodes, components, and functionalities of the example embodiment and mode of FIG. 6 which have same or similar reference numerals with those of FIG. 4 and/or FIG. 5 are understood to be the same or similar in structure and operation unless otherwise described herein or clear from context.

The IAB node processor(s) 54 of child IAB node 72(6) of FIG. 6, and particularly IAB node power management controller 38(6), is shown as comprising IAB node transmission power report generator 120. The IAB node transmission power report generator 120 is configured to generate a report of transmission power of the IAB node for transmission to a parent node, e.g., to parent IAB node 70 shown in FIG. 6. The report generated by IAB node transmission power report generator 120 may include transmission power utilization and/or transmission power headroom (PHR). In an example implementation, mobile-termination circuitry Mobile-Termination (MT) 50 of child IAB node 72(6) may transmit the report of transmission power to the parent node. Arrow 122 in FIG. 6 shows transmission of the IAB node transmission power report to parent IAB node 70.

In an example embodiment and mode, the IAB node transmission power report generator 120 generates the IAB node transmission power report to specify each of the following:

(1) power utilization by the mobile-termination circuitry for transmission on a Physical Uplink Shared Channel (PUSCH), as determined by PUSCH power controller 81;

(2) power utilization by the mobile-termination circuitry for transmission on a Physical Uplink Control Channel (PUCCH), as determined by PUCCH power controller 82;

(3) power utilization by the distributed unit circuitry for transmission on a Physical Downlink Shared Channel (PDSCH); as determined by PDSCH power controller 83; and (4) power utilization by the distributed unit circuitry for transmission on a Physical Downlink Control Channel (PDCCH), as determined by PDCCH power controller 84.

In another example embodiment and mode, the IAB node transmission power report generator 120 generates the IAB node transmission power report to specify each of the following:

(a) power utilization by the mobile-termination circuitry for transmission on both Physical Uplink Shared Channel (PUSCH), as determined by PUSCH power controller 81, and power utilization by the mobile-termination circuitry for transmission on a Physical Uplink Control Channel (PUCCH), as determined by PUCCH power controller 82;

(b) power utilization by the distributed unit circuitry for transmission on both a Physical Downlink Shared Channel (PDSCH); as determined by PDSCH power controller 83, and power utilization by the distributed unit circuitry for transmission on a Physical Downlink Control Channel (PDCCH), as determined by PDCCH power controller 84

In view of its ability to generate the IAB node transmission power report generator 120 with specificity for (a)-(b), the IAB node transmission power report generator 120 is illustrated in FIG. 6 as comprising both MT transmission power report generator 124 and DU transmission power report generator 126.

In an example embodiment and mode, IAB node transmission power report generator 120 may additionally or alternatively generate the IAB node transmission power report to include a report of transmission power headroom (PHR) in addition to or as an alternative to transmission power utilization. As used herein, transmission power headroom (PHR) may be a difference between a maximum transmission power allocated to the child IAB node 72, or to its Mobile-Termination (MT) 50 or to its IAB node processor(s) 54, and actual transmission power utilization by the child IAB node 72, or by its Mobile-Termination (MT) 50, or by its IAB node processor(s) 54. Such maximum transmission power allocation may be stored in one or more of PUSCH configuration register 91, PUCCH configuration register 92, PDSCH configuration register 93, and/or PDCCH configuration register 94, or may be derived therefrom. As indicated above, the maximum permitted transmission power for the mobile-termination circuitry and the maximum permitted transmission power for the distributed unit circuitry may be configurable, e.g., by parent IAB node 70. FIG. 6 thus shows IAB node transmission power report generator 120 as optionally comprising transmission power headroom report generator 127. The transmission power headroom report generator 127 thus may include an indication of the transmission power headroom (PHR) in the IAB node transmission power report 122. The indication of transmission power headroom (PHR) may be a collective value representing transmission power headroom (PHR) for the entire child IAB node 72, and may include more specify information such as transmission power headroom (PHR) or one or both of the Distributed Unit (DU) 52 and the IAB node processor(s) 54 of child IAB node 72. Alternately or additionally, the power headroom of MT transmission power may be reported. For an MT of an IAB node, the power headroom 9 PHR) may be reported in a manner similar to New radio uplink transmission power control, TPC, at an UE terminal. The maximum transmission power information may of DU part be indicated to a parent node.

The IAB node transmission power report generated by IAB node transmission power report generator 120 may be formatted in any suitable manner. For example, the IAB node transmission power report may comprise an information element that includes a total transmission power utilization for the child IAB node 72, with other information elements or sub-information elements that specify each of (1)-(4) and/or (a)-(b) listed above. In an example implementation in which the transmission power headroom report generator 127 is present and active, the IAB node transmission power report 122 may include, either in the same information element, e.g., as sub-information elements, or in an additional information element, the transmission power headroom (PHR) reports for the entire child IAB node 72 and/or its Mobile-Termination (MT) 50 and Distributed Unit (DU) 52.

FIG. 6 shows that IAB node 70 may comprise an IAB network power management controller 36. The receiver circuitry 79 of parent IAB node 70 may receive the IAB node transmission power report, which in turn may be utilized by child IAB node transmission power report processor 128. The IAB node transmission power report may be used by the parent node to schedule resources on the child MT or DU, especially on the child, it can be used to dictate the modulation and coding schemes to be used and the resources the child transmissions can occupy. The IAB node transmission power report may also or alternatively be used to allocate resources to the DU/MT, and/or to re-route traffic backhauled on a child link.

D: Prioritization of Transmission Power for IAB Nodes

Figure 7:
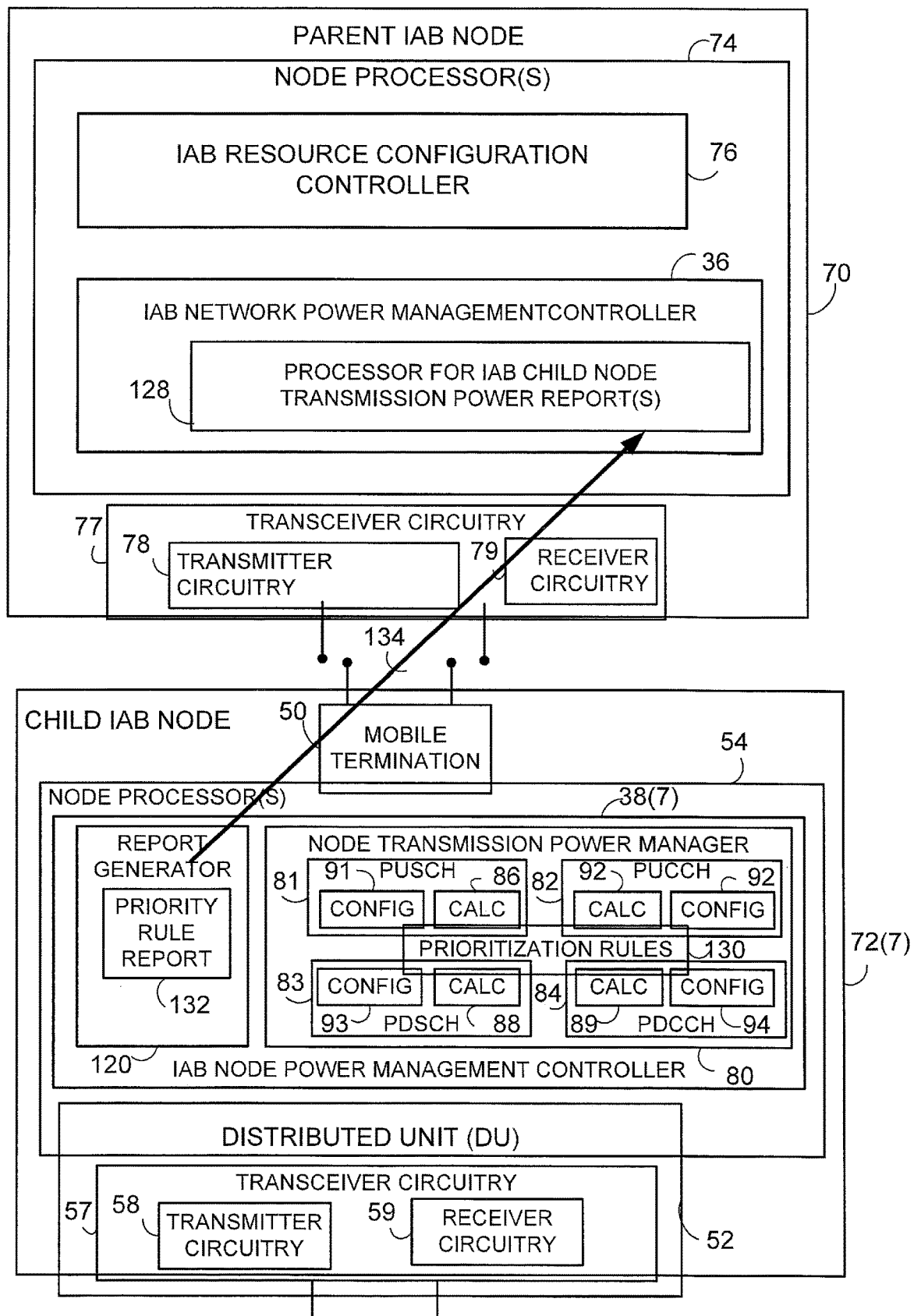
FIG. 7 is a schematic view of portions of an example communication system comprising an Integrated Access and Backhaul (IAB) network wherein an IAB node implements IAB node transmission power prioritization rule(s) in certain circumstances.

FIG. 7 illustrates another example embodiment of an IAB network showing child IAB node 72(7) with a transmission power prioritization capability. Nodes, components, and functionalities of the example embodiment and mode of FIG. 7 which have same or similar reference numerals with those of FIG. 4 and/or FIG. 5 and/or FIG. 6 are understood to be the same or similar in structure and operation unless otherwise described herein or clear from context.

The IAB node processor(s) 54 of child IAB node 72(7) of FIG. 7, and particularly IAB node power management controller 38(7), is shown as comprising IAB node transmission power prioritization rule register or memory 130, herein also referred to simply as IAB node transmission power prioritization rule(s) 130.

Figure 8:
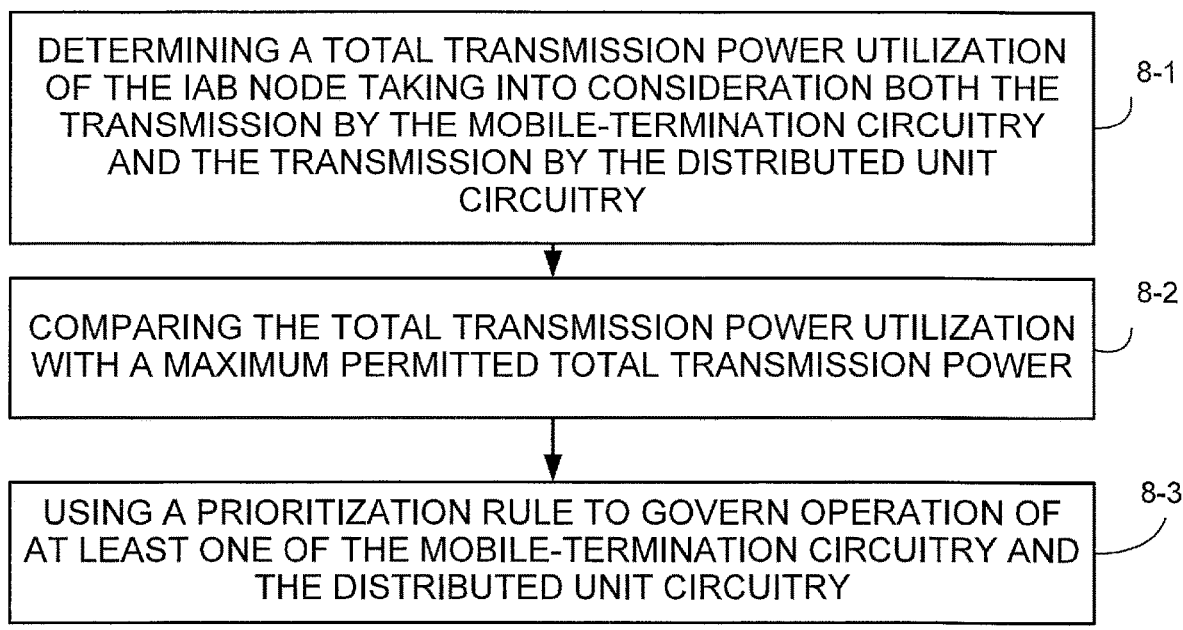
FIG. 8 is a flowchart showing example, non-limiting, basic acts or steps that may be performed by an IAB node of FIG. 7 in conjunction with IAB node transmission power prioritization rule(s).

In the example embodiment and mode of FIG. 7, the IAB node power management controller 38(7) performs example, representative acts or steps shown in FIG. 8. Act 8-1 comprises determining a total transmission power utilization of the IAB node taking into consideration both the transmission by the mobile-termination circuitry and the transmission by the distributed unit circuitry. Act 8-2 comprises comparing the total transmission power utilization with a maximum permitted total transmission power. Act 8-3 is performed when the total transmission power utilization of the IAB node is in a predetermined neighborhood of the maximum permitted total transmission power. Act 8-3 comprises using a prioritization rule to govern operation of at least one of the mobile-termination circuitry and the distributed unit circuitry. The prioritization rule utilized in act 8-3 may be stored as IAB node transmission power prioritization rule(s) 130, and may have the result or consequences described below.

The IAB node transmission power prioritization rule(s) 130 may be implemented as logic or coded instructions which are configured to obtain an intended transmission power strategy. The IAB node transmission power prioritization rule(s) 130 may be configured at the parent IAB node 70(7), e.g., either pre-configured or downloaded from a parent IAB node such as an IAB node that serves as a family power management JAB node. As understood from the foregoing, the maximum transmitted power permitted for child IAB node 72(7) may be configurable, e.g., for both the DU and the MT.

As mentioned above, act 8-3 is performed when the total transmission power utilization of the IAB node is in a predetermined neighborhood of the maximum permitted total transmission power. The predetermined neighborhood may be plus or minus a predetermined percentage of the maximum permitted transmission power. The predetermined neighborhood may itself be configured, e.g., preconfigured at the child IAB node 72(7) or downloaded by the network.

On example of an IAB node transmission power prioritization rule is to prioritize the transmissions by the mobile-termination circuitry relative to the transmissions by the distributed unit circuitry when desirable or necessary, e.g., when the total transmission power utilization of the IAB node is in a predetermined neighborhood of the maximum permitted total transmission power. For example, in the event that total transmitted power is near its maximum, operation of IAB node transmission power prioritization rule(s) 130 may privilege or favor the Mobile-Termination (MT) 50. In other words, the MT power is privileged—that is, the parent—child link is privileged over the child-grandchildren link(s); i.e., lower downlink capacity on child-grandchildren links to ensure reliability of the parent child link. Implementation of such a MT-favoring rule may include or cause dropping transmissions on child-grandchild links.

Another example of an IAB node transmission power prioritization rule is to prioritize the transmissions by the distributed unit circuitry relative to the transmissions by the mobile-termination circuitry when desirable or necessary, e.g., when the total transmission power utilization of the IAB node is in a predetermined neighborhood of the maximum permitted total transmission power. For example, in the event that total transmitted power is near its maximum, operation of IAB node transmission power prioritization rule(s) 130 may privilege or favor the Distributed Unit (DU) 52, ensuring reliability of the child-grandchild links.

In the event that the IAB node transmission power prioritization rule(s) 130 are invoked, the child IAB node 72(7) may send a report of such invocation and its consequences to a parent node such as parent IAB node 70. FIG. 7 thus shows IAB node transmission power report generator 120 as comprising an optional prioritization rule(s) invocation report generator 132, which, as an optional feature for this FIG. 7 example embodiment and mode, may send a prioritization rule(s) invocation report 134 to parent IAB node 70.

E: Governance of Du Transmission Power for IAB Nodes

Figure 9:
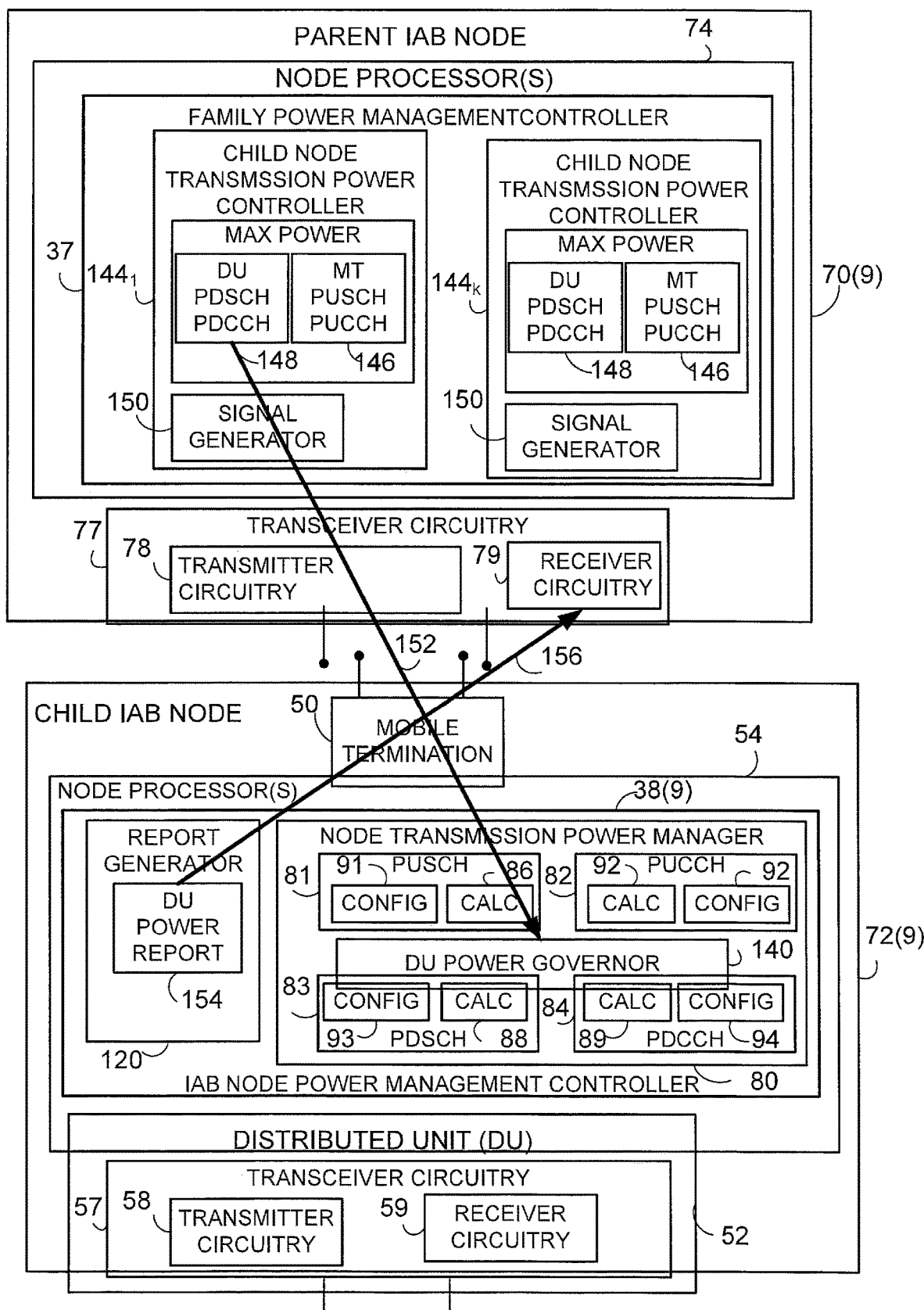
FIG. 9 is a schematic view of portions of an example communication system comprising an Integrated Access and Backhaul (IAB) network wherein an IAB node implements IAB DU transmission power governance in certain circumstances.

FIG. 9 illustrates another example embodiment of an IAB network showing child IAB node 72(9) with DU transmission power governance capability. Nodes, components, and functionalities of the example embodiment and mode of FIG. 9 which have same or similar reference numerals with those of FIG. 4, FIG. 5, FIG. 6, and/or FIG. 7 are understood to be the same or similar in structure and operation unless otherwise described herein or clear from context.

In the example embodiment and mode of FIG. 9, the DU transmission power for PDCCH and/or PDSCH at a DU in an IAB node may be configured by a CU or a parent IAB node. One purpose for such configuration may be to minimize the cross-link interference (CLI) level by setting/configuring the DU transmission power per IAB node.

The IAB node processor(s) 54 of child IAB node 72(9) of FIG. 9, and particularly IAB node power management controller 38(7), is shown as comprising IAB node DU transmission power governor 140, herein also referred to simply as DU power governor 140. FIG. 9 further shows family power management controller 37 of parent IAB node 70(9) as comprising a child node transmission power controller 144 for one or plural child IAB nodes for which parent IAB node 70(9) may have family control or supervisory authority. For example, FIG. 9 shows family power management controller 37 as comprising child node transmission power controller 144$_1$ through child node transmission power controller 144$_k$ for each of k integer number of child IAB nodes which for which parent IAB node 70(9) may have parental power control. Each child node transmission power controller 144 is shown as further comprising a MT maximum power controller 146 and a DU maximum power controller 148, as well as a signal generator 150. The MT maximum power controller 146 may control maximum transmission power for one or both of PUSCH and PUCCH for the Mobile-Termination (MT) 50 of child IAB node 72(9); the DU maximum power controller 148 may control maximum transmission power for one or both of PDSCH and PDCCH for the Distributed Unit (DU) 52 of child IAB node 72(9).

FIG. 9 further shows that the signal generator 150 of child node transmission power controller 144 may generate a DU maximum transmission power control signal 152 which is transmitted by transmitter circuitry 78 of parent IAB node 70(9) to child IAB node 72(9), and which specifies, for example, a maximum DU transmission power for the Distributed Unit (DU) 52 of child IAB node 72(9). The DU maximum transmission power control signal 152 may be used by DU power governor 140 for controlling the maximum power of Distributed Unit (DU) 52 so that transmission power of Distributed Unit (DU) 52 of the particular child IAB node 72(9) shown in FIG. 9 does not, or has less likelihood of, causing cross-link interference with transmissions of other IAB nodes. Thus, the DU maximum transmission power control signal 152, and the DU power governor 140 which receives and operates on the DU maximum transmission power control signal 152, takes into consideration actual or possible cross-link interference with transmissions of other JAB nodes.

The DU transmission power for PDSCH may be configured separately from that for PDCCH. In other words the DU power governor 140 may govern the transmission power separately for PDSCH and PDCCH.

Figure 10:
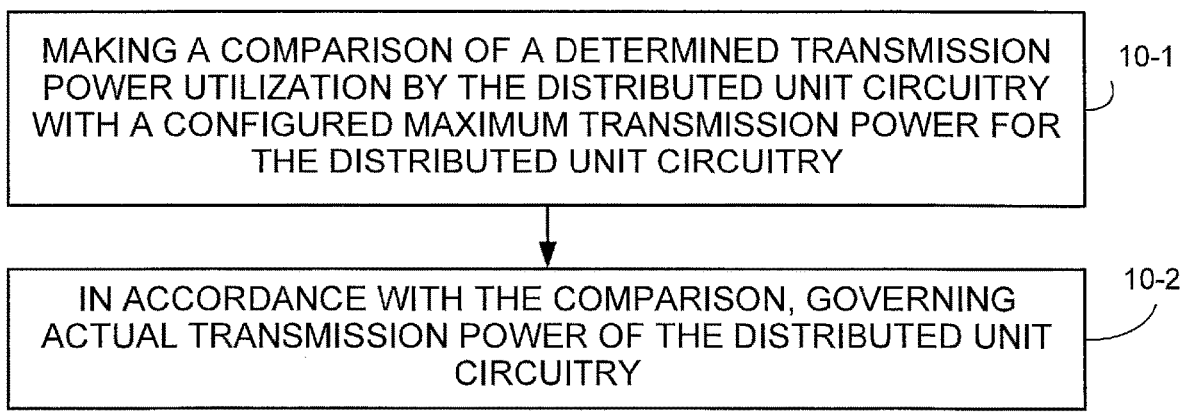
FIG. 10 is a flowchart showing example, non-limiting, basic acts or steps that may be performed by an IAB node of FIG. 9 in conjunction with IAB node DU transmission power governance.

FIG. 10 shows example, representative basic acts or steps that may be performed by the child IAB node 72(9) of FIG. 9. Act 10-1 comprises making a comparison of a determined transmission power utilization by the distributed unit circuitry with a configured maximum transmission power for the distributed unit circuitry. Act 10-2 comprises, in accordance with the comparison, governing actual transmission power of the distributed unit circuitry. Such act of governing actual transmission power of the distributed unit circuitry may include reduction of DU transmission power, or even dropping links or connections.

The parent IAB node 70(9) of FIG. 9 has thus been shown as comprising parent node processor circuitry 74 which is configured to generate, for each of plural child IAB nodes, a maximum transmission power for distributed unit circuitry comprising the plural child IAB nodes. As indicated, one example purpose of maximum transmission power being so configured is in consideration of cross-link interference between the plural child IAB nodes. The parent IAB node 709(9) also comprises transmitter circuitry 78 configured to transmit an indication of the maximum transmission power to the plural child IAB nodes.

The DU maximum transmission power control signal 152 may be transmitted from parent IAB node 70(9) to child IAB node 72(9) in any suitable manner. For example, DU maximum transmission power control signal 152 may be transmitted via an F1-AP interface (see FIG. 1), as or in a medium access control (MAC) control element, or by downlink control information (DCI).

In the event that the IAB node DU transmission power governance is invoked, the child IAB node 72(9) may send a report of such invocation and its consequences to a parent node such as parent IAB node 70(9). FIG. 9 thus shows IAB node DU transmission power report generator 140 as comprising DU governance invocation report generator 154, which, as an optional feature for this FIG. 9 example embodiment and mode, may send a DU governance invocation report, or DU power report 156, to parent IAB node 70(9).

F: Transmission Power for IAB Nodes with Multiple MTS

Figure 11:
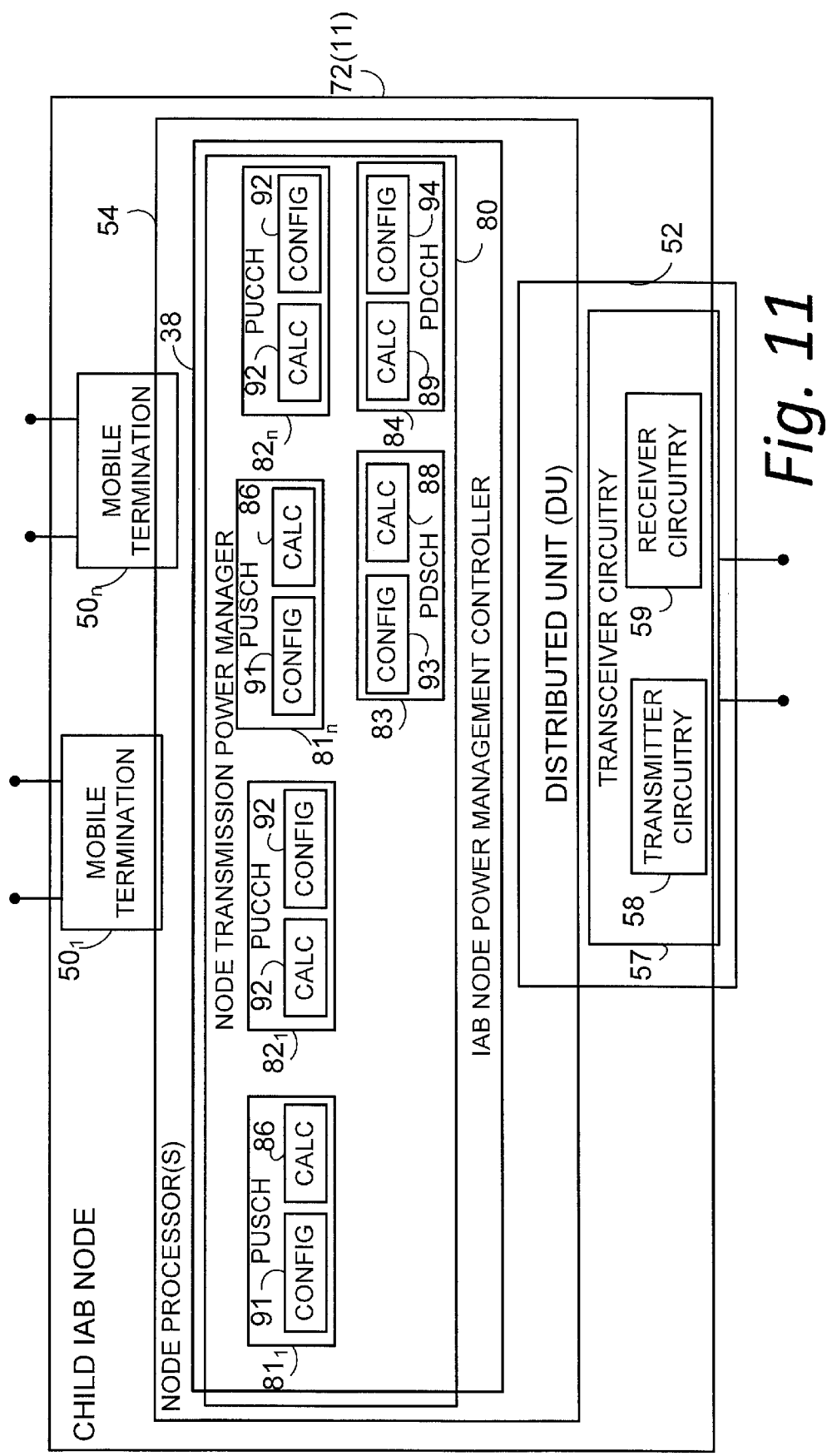
FIG. 11 is a schematic view of portions of an example communication system comprising an Integrated Access and Backhaul (IAB) network wherein transmission power utilization is determined for an IAB node comprising plural Mobile-Terminations (MTs).

Example embodiments and modes described herein have thus far illustrated the child IAB node 72 as comprising one Mobile-Termination (MT) 50. However, for each of the example embodiments and modes described herein the child IAB node 72 may comprise plural Mobile-Terminations (MTs) 50, in a manner such as illustrated in FIG. 11. As shown in FIG. 11, child IAB node 72(11) may comprise plural Mobile-Terminations (MTs) 50, such as Mobile-Termination (MT) $50_1$ through Mobile-Termination (MT) $50_n$. In addition, for each Mobile-Termination (MT) 50 the IAB node power management controller 38 may comprise PUSCH power controller 81 and PUCCH power controller 82. In other words, the IAB node power management controller 38 may comprise PUSCH power controller $81_1$ and PUCCH power controller $82_1$ for Mobile-Termination (MT) 501, and PUSCH power controller $81_n$ and PUCCH power controller $82_n$ for Mobile-Termination (MT) $50_n$.

In general these plural MTs may operate independently of each other with different power control parameters independently, because of different RF front ends because they would transceive on different bands. Likewise, they may operate dependently if these MTs share the same frequency band. In either case, the MTs may be separately signaled and power controlled and may separately report their power headrooms. Thus, at least some aspects of the technology disclosed herein may be applied to the PUSCH of the MT if a single MT entity existed in the IAB node, or if multiple MTs on different carriers on different frequency bands were implemented in the IAB node.

G: Designation of IAB Nodes as Power Management Parents

Figure 12:
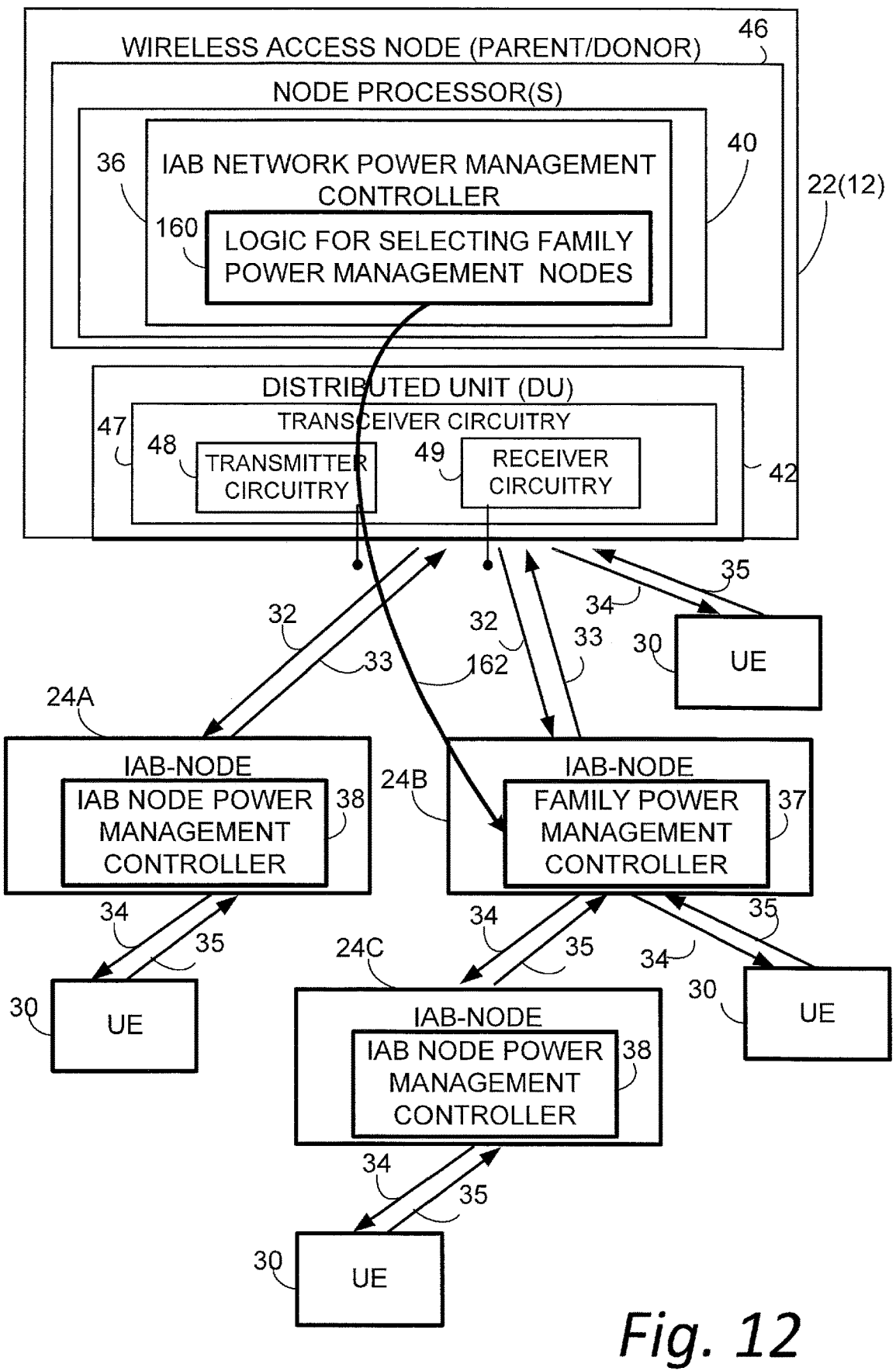
FIG. 12 is a schematic view of portions of an example communication system comprising an Integrated Access and Backhaul (IAB) network wherein a donor IAB node selects one or more principal parent or family power management IAB nodes.

FIG. 12 illustrates another example embodiment of an IAB network showing donor IAB node 22(12) as comprising IAB network power management controller 36. One example purpose of IAB network power management controller 36 may be to enable the donor IAB node 22(12) to select one or more IAB nodes to serve as a "principal parent" or family power management IAB nodes. Examples of IAB nodes that may serve as family power management IAB nodes are shown as IAB nodes 70 in one or more of FIG. 6, FIG. 7, and FIG. 9. Nodes, components, and functionalities of the example embodiment and mode of FIG. 9 which have same or similar reference numerals with those of FIG. 4, FIG. 5, FIG. 6, FIG. 7, and/or FIG. 9 are understood to be the same or similar in structure and operation unless otherwise described herein or clear from context.

FIG. 12 shows that node processor(s) 46 of donor IAB node 22(12) may comprise logic 160 for selecting family power management nodes(s). The family power management nodes(s) logic 160 preferably comprises IAB network power management controller 36, and may be a set of coded instructions on non-transient media that may be executed by node processor(s) 46 of donor IAB node 22(12). FIG. 12 shows by arrow 162 that family power management nodes(s) logic 160 has selected IAB node 24B to be a family power management nodes. As a result of such selection, 24B is shown as comprising family power management controller 37. A node which is designated as a family power management IAB node is responsible for regulating the power transmitted by its child IAB nodes. For example, the IAB node 24B of FIG. 12, designated as a family power management IAB node, regulates the power transmission of not only wireless terminals served by JAB node 24B, but also the power transmission of IAB node 24C and wireless terminals served by IAB node 24C. The donor IAB node 22(12) may also designated itself as a family power management IAB node for regulating power transmission of IAB node 24A and wireless terminals served by IAB node 24A, as well as for regulating power transmission of IAB node 24B and wireless terminals served by IAB node 24B.

Thus, the example embodiment and mode encompasses a donor Integrated Access and Backhaul (IAB) node in an Integrated Access and Backhaul (IAB) network which may comprise processor circuitry and transmitter circuitry. The processor circuitry is configured to designate one or more IAB nodes of the Integrated Access and Backhaul (IAB) network as a power regulation IAB node which is permitted to perform power management of power transmissions of a child node of the power regulation IAB node. The transmitter circuitry is configured to transmit a power regulation IAB node designation, represented by arrow 162, to the power regulation IAB node.

The criteria for selection of a candidate IAB node as a family power management IAB node may be coded or programmed into family power management nodes(s) logic 160. Such criteria may be based on or consider such factors location/role of the IAB node 24 in relation to overall or local network topology, e.g., the number of other IAB nodes for which the candidate node is parent, and the history of traffic or utilization of such candidate node and its children.

It should be understood that, unless otherwise indicate or apparent from context, one or more of the features of the example embodiments and modes herein, such as for example FIG. 4, FIG. 5, FIG. 6, FIG. 7, FIG. 9, FIG. 11, and FIG. 12, may be utilized in conjunction with features from other one or more of such example embodiments and modes.

Figure 13:
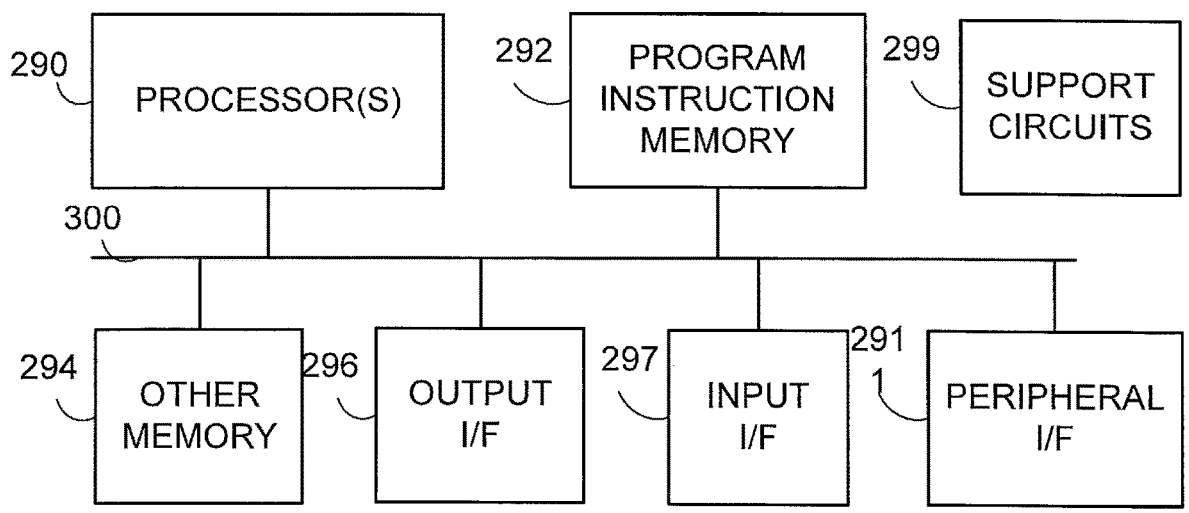
FIG. 13 is a diagrammatic view showing example elements comprising electronic machinery which may comprise a wireless terminal, a radio access node, and a core network node according to an example embodiment and mode.

Certain units and functionalities of the systems 20 may be implemented by electronic machinery. For example, electronic machinery may refer to the processor circuitry described herein, such as IAB node processor(s) 54/74, donor node processor(s) 46, and node processor(s) 66. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 13 shows an example of electronic machinery, e.g., processor circuitry, as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, JAB node processor(s) 54, donor node processor(s) 46, and node processor(s) 66.

An memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless access node 22, the wireless relay node 24, and/or the wireless terminal/wireless node 30 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic functioning of an Integrated Access and Backhaul (IAB) network, e.g., methods and procedures to deal with power management.

For example, in one or more of its various aspects the technology disclosed herein concerns and/or provides:

The use of measurement reports, e.g., of power headroom taking into account DU transmissions and transmissions of MTs both individual and simultaneously. A power headroom reporting (PHR) is provided for IAB nodes; which is especially useful given the fact that MTs may also be transmitting simultaneously as the DU is in a given IAB node.

Power control under the control of a "Principal Parent" ("PP") who is responsible for regulating the transmitted power over its children. The PP is designated as such by the CU.

Rules for transmission cessation on one or more entities (MT(s) and/or DU) that allow configurable prioritization of which entities are privileged for transmissions.

Rules for Power Control for IAB child nodes.

Release 16 of 3GPP's cellular telephony specifications promise the introduction of features to support interactive access and backhaul (IAB). The technology disclosed herein provides IAB nodes with power management functionality which is useful for many reasons. For example, it is important for capacity management purposes in the overall IAB network to manage inter-cell interference (and each node may comprise one or more cells). As a second example reason, resource allocation in any IAB nodes' DUs may be constrained by its overall transmission power. For a third example reason, both DU and MT transmissions must meet some sort of emission requirements whether via spectral emission mask (SEM) or adjacent channel leakage ratio (ACLR); and this must be achieved with Class A amplifiers; hence transmission below maximum transmitted power should be consistently achieved to meet these requirements.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

TABLE 1 ------------------------------------------------------------------------

If a UE transmits a PUSCH on active UL BWP $b$ of carrier $f$ of serving cell $c$ using parameter set configuration with index $j$ and PUSCH power control adjustment state with index $l$, the UE determines the PUSCH transmission power $P_{PUSCH,b,f,c}(i,j,q_d,l)$ in PUSCH transmission occasion $i$ as $$P_{PUSCH,b,f,c}(i,j,q_d,l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l) \end{cases}$$

[dBm]

where,

- $P_{CMAX,f,c}(i)$ is the UE configured maximum output power defined in [8-1, TS 38.101-1], [8-2, TS38.101-2] and [8-3, TS38.101-3] for carrier $f$ of serving cell $c$ in PUSCH transmission occasion $i$.

- $P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, ..., J-1\}$.

- If a UE is not provided *P0-PUSCH-AlphaSet* or for a PUSCH transmission scheduled by a RAR UL grant as described in Subclause 8.3, $j = 0$, $P_{O\_UE\_PUSCH,b,f,c}(0) = 0$, and $P_{O\_NOMINAL\_PUSCH,f,c}(0) = P_{O\_PRE} + \Delta_{PREAMBLE\_Msg3}$, where the parameter *preambleReceivedTargetPower* [11, TS 38.321] (for $P_{O\_PRE}$) and *msg3-DeltaPreamble* (for $\Delta_{PREAMBLE\_Msg3}$) are provided by higher layers, or $\Delta_{PREAMBLE\_Msg3} = 0$ dB if *msg3-DeltaPreamble* is not provided, for carrier $f$ of serving cell $c$

- For a PUSCH (re)transmission configured by *ConfiguredGrantConfig*, $j=1$, $P_{O\_NOMINAL\_PUSCH,f,c}(1)$ is provided by *p0-NominalWithoutGrant*, or $P_{O\_NOMINAL\_PUSCH,f,c}(1) = P_{O\_NOMINAL\_PUSCH,f,c}(0)$ if *p0-NominalWithoutGrant* is not provided, and $P_{O\_UE\_PUSCH,b,f,c}(1)$ is provided by *p0* obtained from *p0-PUSCH-Alpha* in *ConfiguredGrantConfig* that provides an index *P0-PUSCH-AlphaSetId* to a set of s *P0-PUSCH-AlphaSet* for active UL BWP $b$ of carrier $f$ of serving cell $c$

- For $j \in \{2,...,J-1\} = S_J$, a $P_{O\_NOMINAL\_PUSCH,f,c}(j)$ value, applicable for all $j \in S_J$, is provided by *p0-NominalWithGrant*, or $P_{O\_NOMINAL\_PUSCH,f,c}(j) = P_{O\_NOMINAL\_PUSCH,f,c}(0)$ if *p0-NominalWithGrant* is not provided, for each carrier $f$ of serving cell $c$ and a set of $P_{O\_UE\_PUSCH,b,f,c}(j)$ values are provided by a set of *p0* in *P0-PUSCH-AlphaSet* indicated by a respective set of *p0-PUSCH-AlphaSetId* for active UL BWP $b$ of carrier $f$ of serving cell $c$

- If the UE is provided by *SRI-PUSCH-PowerControl* more than one values of *p0-PUSCH-AlphaSetId* and if DCI format 0_1 includes a SRI field, the UE obtains a mapping from *sri-PUSCH-PowerControlId* in *SRI-PUSCH-PowerControl* between a set of values for the SRI field in DCI format 0_1 [5, TS 38.212] and a set of indexes provided by *p0-PUSCH-AlphaSetId* that map to a set of *P0-PUSCH-AlphaSet* values. If the PUSCH transmission is scheduled by a DCI format 0_1 that includes a SRI field, the UE determines the value of $P_{O\_UE\_PUSCH,b,f,c}(j)$ from the *p0-PUSCH-AlphaSetId* value that is mapped to the SRI field value

- If the PUSCH transmission is scheduled by a DCI format 0_0 or by a DCI format 0_1 that does not include a SRI field, or if *SRI-PUSCHPowerControl* is not provided to the UE, $j=2$, and the UE determines $P_{O\_UE\_PUSCH,b,f,c}(j)$ from the value of the first *p0-Pusch-AlphaSet* in *p0-AlphaSets*

- For $\alpha_{b,f,c}(j)$

- For $j=0$, $\alpha_{b,f,c}(0)$ is a value of *msg3-Alpha*, when provided; otherwise, $\alpha_{b,f,c}(0)=1$

- For $j=1$, $\alpha_{b,f,c}(1)$ is provided by *alpha* obtained from *p0-PUSCH-Alpha* in *ConfiguredGrantConfig* providing an index *P0-PUSCH-AlphaSetId* to a set of *P0-PUSCH-AlphaSet* for active UL BWP $b$ of carrier $f$ of serving cell $c$

- For $j \in S_j$, a set of $\alpha_{b,f,c}(j)$ values are provided by a set of *alpha* in *P0-PUSCH-AlphaSet* indicated by a respective set of *p0-PUSCH-AlphaSetId* for active UL BWP $b$ of carrier $f$ of serving cell $c$

- If the UE is provided *SRI-PUSCH-PowerControl* and more than one values of *p0-PUSCH-AlphaSetId*, and if DCI format 0_1 includes a SRI field, the UE obtains a mapping from *sri-PUSCH-PowerControlId* in *SRI-PUSCH-PowerControl* between a set of values for the SRI field in DCI format 0_1 [5, TS 38.212] and a set of indexes provided by *p0-PUSCH-AlphaSetId* that map to a set of *P0-PUSCH-AlphaSet* values. If the PUSCH transmission is scheduled by a DCI format 0_1 that includes a SRI field, the UE determines the values of $\alpha_{b,f,c}(j)$ from the *p0-PUSCH-AlphaSetId* value that is mapped to the SRI field value

- If the PUSCH transmission is scheduled by a DCI format 0_0 or by a DCI format 0_1 that does not include a SRI field, or if *SRI-PUSCH-PowerControl* is not provided to the UE, $j=2$, and the UE determines $\alpha_{b,f,c}(j)$ from the value of the first *p0-PUSCH-AlphaSet* in *p0-AlphaSets*

- $M_{RB,b,f,c}^{PUSCH}(i)$ is the bandwidth of the PUSCH resource assignment expressed in number of resource blocks for PUSCH transmission occasion $i$ on active UL BWP $b$ of carrier $f$ of serving cell $c$ and $\mu$ is a SCS configuration defined in [4, TS 38.211]

- $PL_{b,f,c}(q_d)$ is a downlink pathloss estimate in dB calculated by the UE using reference signal (RS) index $q_d$ for the active DL BWP, as described in Subclause 12, of serving cell $c$

- If the UE is not provided *PUSCH-PathlossReferenceRS* or before the UE is provided dedicated higher layer parameters, the UE calculates $PL_{b,f,c}(q_d)$ using a RS resource from the SS/PBCH block that the UE uses to obtain *MIB*

- If the UE is configured with a number of RS resource indexes, up to the value of *maxNrofPUSCH-PathlossReferenceRSs*, and a respective set of RS configurations for the number of RS resource indexes by *PUSCH-PathlossReferenceRS*, the set of RS resource indexes can include one or both of a set of SS/PBCH block indexes, each provided by *ssb-Index* when a value of a corresponding *pusch-PathlossReferenceRS-Id* maps to a SS/PBCH block index, and a set of CSI-RS resource indexes, each provided by *csi-RS-Index* when a value of a corresponding *pusch-PathlossReferenceRS-Id* maps to a CSI-RS resource index. The UE identifies a RS resource index $q_d$ in the set of RS resource indexes to correspond either to a SS/PBCH block index or to a CSI-RS resource index as provided by *pusch-PathlossReferenceRS-Id* in *PUSCH-PathlossReferenceRS*

- If the PUSCH transmission is scheduled by a RAR UL grant as described in Subclause 8.3, the UE uses the same RS resource index $q_d$ as for a corresponding PRACH transmission

- If the UE is provided *SRI-PUSCH-PowerControl* and more than one values of *PUSCH-PathlossReferenceRS-Id*, the UE obtains a mapping from *sri-PUSCH-PowerControlId* in *SRI-PUSCH-PowerControl* between a set of values for the SRI field in DCI format 0_1 and a set of *PUSCH-PathlossReferenceRS-Id* values. If the PUSCH transmission is scheduled by a DCI format 0_1 that includes a SRI field, the UE determines the RS resource index $q_d$ from the value of *PUSCH-PathlossReferenceRS-Id* that is mapped to the SRI field value where the RS resource is either on serving cell $c$ or, if provided, on a serving cell indicated by a value of *pathlossReferenceLinking*

- If the PUSCH transmission is scheduled by a DCI format 0_0, and if the UE is provided a spatial setting by PUCCH-Spatialrelationinfo for a PUCCH resource with a lowest index for active UL BWP $b$ of each carrier $f$ and serving cell $c$, as described in Subclause 9.2.2, the UE uses the same RS resource index $q_d$ as for a PUCCH transmission in the PUCCH resource with the lowest index

- If the PUSCH transmission is scheduled by a DCI format 0_0 and if the UE is not provided a spatial setting for a PUCCH transmission, or by a DCI format 0_1 that does not include a SRI field, or if *SRI-PUSCH-PowerControl* is not provided to the UE, the UE determines a RS resource index $q_d$ with a respective *PUSCH-PathlossReferenceRS-Id* value being equal to zero where the RS resource is either on serving cell $c$ or, if provided, on a serving cell indicated by a value of *pathlossReferenceLinking*

- For a PUSCH transmission configured by *ConfiguredGrantConfig*, if *rrc-ConfiguredUplinkGrant* is included in *ConfiguredGrantConfig*, a RS resource index $q_d$ is provided by a value of *pathlossReferenceIndex* included in *rrc-ConfiguredUplinkGrant* where the RS resource is either on serving cell $c$ or, if provided, on a serving cell indicated by a value of *pathlossReferenceLinking*

- For a PUSCH transmission configured by *ConfiguredGrantConfig* that does not include *rrc-ConfiguredUplinkGrant*, the UE determines a RS resource index $q_d$ from a value of *PUSCH-PathlossReferenceRS-Id* that is mapped to a SRI field value in a DCI format activating the PUSCH transmission. If the DCI format activating the PUSCH transmission does not include a SRI field, the UE determines a RS resource index $q_d$ with a respective *PUSCH-PathlossReferenceRS-Id* value being equal to zero where the RS resource is either on serving cell $c$ or, if provided, on a serving cell indicated by a value of *pathlossReferenceLinking*

$PL_{f,c}(q_d)$ = *referenceSignalPower* − higher layer filtered RSRP, where *referenceSignalPower* is provided by higher layers and RSRP is defined in [7, TS 38.215] for the reference serving cell and the higher layer filter configuration provided by *QuantityConfig* is defined in [12, TS 38.331] for the reference serving cell If the UE is not configured periodic CSI-RS reception, *referenceSignalPower* is provided by *ss-PBCH-BlockPower*. If the UE is configured periodic CSI-RS reception, *referenceSignalPower* is provided either by *ss-PBCH-BlockPower* or by *powerControlOffsetSS* providing an offset of the CSI-RS transmission power relative to the SS/PBCH block transmission power [6, TS 38.214]. If *powerControlOffsetSS* is not provided to the UE, the UE assumes an offset of 0 dB.

- $\Delta_{TF,b,f,c}(i) = 10\log_{10}\left(\left(2^{BPRE \cdot K_s} - 1\right) \cdot \beta_{offset}^{PUSCH}\right)$ for $K_s = 1.25$ and $\Delta_{TF,b,f,c}(i) = 0$ for $K_s = 0$ where $K_s$ is provided by *deltaMCS* for each UL BWP $b$ of each carrier $f$ and serving cell $c$. If the PUSCH transmission is over more than one layer [6, TS 38.214], $\Delta_{TF,b,f,c}(i) = 0$. BPRE and $\beta_{offset}^{PUSCH}$, for active UL BWP $b$ of each carrier $f$ and each serving cell $c$, are computed as below

- BPRE $= \sum_{r=0}^{C-1} K_r / N_{RE}$ for PUSCH with UL-SCH data and BPRE $= Q_m \cdot R / \beta_{offset}^{PUSCH}$ for CSI transmission in a PUSCH without UL-SCH data, where

- $C$ is a number of transmitted code blocks, $K_r$ is a size for code block $r$, and $N_{RE}$ is a number of resource elements determined as $N_{RE} = M_{RB,b,f,c}^{PUSCH}(i) \cdot \sum_{j=0}^{N_{symb,b,f,c}^{PUSCH}(i)-1} N_{sc,data}^{RB}(i,j)$, where $N_{symb,b,f,c}^{PUSCH}(i)$ is a number of symbols for PUSCH transmission occasion $i$ on active UL BWP $b$ of carrier $f$ of serving cell $c$, $N_{sc,data}^{RB}(i,j)$ is a number of subcarriers excluding DM-RS subcarriers and phase-tracking RS samples [4, TS 38.211] in PUSCH symbol $j$, $0 \le j < N_{symb,b,f,c}^{PUSCH}(i)$, and $C$, $K_r$ are defined in [5, TS 38.212]

- $\beta_{offset}^{PUSCH} = 1$ when the PUSCH includes UL-SCH data and $\beta_{offset}^{PUSCH} = \beta_{offset}^{CSI,1}$, as described in Subclause 9.3, when the PUSCH includes CSI and does not include UL-SCH data

- $Q_m$ is the modulation order and $R$ is the target code rate, as described in [6, TS 38.214], provided by the DCI format scheduling the PUSCH transmission that includes CSI and does not include UL-SCH data

- For the PUSCH power control adjustment state $f_{b,f,c}(i,l)$ for active UL BWP $b$ of carrier $f$ of serving cell $c$ in PUSCH transmission occasion $i$

- $\delta_{PUSCH,b,f,c}(i,l)$ is a TPC command value included in a DCI format 0_0 or DCI format 0_1 that schedules the PUSCH transmission occasion $i$ on active UL BWP $b$ of carrier $f$ of serving cell $c$ or jointly coded with other TPC commands in a DCI format 2_2 with CRC scrambled by TPC-PUSCH-RNTI, as described in Subclause 11.3

- $l \in \{0,1\}$ if the UE is configured with *twoPUSCH-PC-AdjustmentStates* and $l = 0$ if the UE is not configured with *twoPUSCH-PC-AdjustmentStates* or if the PUSCH transmission is scheduled by a RAR UL grant as described in Subclause 8.3

- For a PUSCH (re)transmission configured by *ConfiguredGrantConfig*, the value of $l \in \{0,1\}$ is provided to the UE by *powerControlLoopToUse*

- If the UE is provided *SRI-PUSCH-PowerControl*, the UE obtains a mapping between a set of values for the SRI field in DCI format 0_1 and the $l$ value(s) provided by *sri-PUSCH-ClosedLoopIndex*. If the PUSCH transmission is scheduled by a DCI format 0_1 and if DCI format 0_1 includes a SRI field, the UE determines the $l$ value that is mapped to the SRI field value

- If the PUSCH transmission is scheduled by a DCI format 0_0 or by a DCI format 0_1 that does not include a SRI field, or if a *SRI-PUSCH-PowerControl* is not provided to the UE, $l = 0$

- If the UE obtains one TPC command from a DCI format 2_2 with CRC scrambled by a TPC-PUSCH-RNTI, the $l$ value is provided by the closed loop indicator field in DCI format 2_2

- $f_{b,f,c}(i,l) = f_{b,f,c}(i-i_0,l) + \sum_{m=0}^{c(D_i)-1} \delta_{PUSCH,b,f,c}(m,l)$ is the PUSCH power control adjustment state $l$ for active UL BWP $b$ of carrier $f$ of serving cell $c$ and PUSCH transmission occasion $i$ if the UE is not provided *tpc-Accumulation*, where

- The $\delta_{PUSCH,b,f,c}$ values are given in Table 7.1.1-1

- $\sum_{m=0}^{c(D_i)-1} \delta_{PUSCH,b,f,c}(m,l)$ is a sum of TPC command values in a set $D_i$ of TPC command values with cardinality $c(D_i)$ that the UE receives between $K_{PUSCH}(i-i_0)-1$ symbols before PUSCH transmission occasion $i-i_0$ and $K_{PUSCH}(i)$ symbols before PUSCH transmission occasion $i$ on active UL BWP $b$ of carrier $f$ of serving cell $c$ for PUSCH power control adjustment state $l$, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion $i$

- If a PUSCH transmission is scheduled by a DCI format 0_0 or DCI format 0_1, $K_{PUSCH}(i)$ is a number of symbols for active UL BWP $b$ of carrier $f$ of serving cell $c$ after a last symbol of a corresponding PDCCH reception and before a first symbol of the PUSCH transmission

- If a PUSCH transmission is configured by *ConfiguredGrantConfig*, $K_{PUSCH}(i)$ is a number of $K_{PUSCH,min}$ symbols equal to the product of a number of symbols per slot, $N_{symb}^{slot}$, and the minimum of the values provided by *k2* in *PUSCH-ConfigCommon* for active UL BWP $b$ of carrier $f$ of serving cell $c$

- If the UE has reached maximum power for active UL BWP $b$ of carrier $f$ of serving cell $c$ at PUSCH transmission occasion $i-i_0$ and $\sum_{m=0}^{c(D_i)-1} \delta_{PUSCH,b,f,c}(m,l) \geq 0$, then $f_{b,f,c}(i,l) = f_{b,f,c}(i-i_0,l)$

- If UE has reached minimum power for active UL BWP $b$ of carrier $f$ of serving cell $c$ at PUSCH transmission occasion $i - i_0$ and $$\sum_{m=0}^{C(D_i)-1} \delta_{PUSCH, b,f,c}(m,l) \leq 0 \text{, then } f_{b,f,c}(i,l) = f_{b,f,c}(i - i_0, l)$$

- A UE resets accumulation of a PUSCH power control adjustment state $l$ for active UL BWP $b$ of carrier $f$ of serving cell $c$ to $$f_{b,f,c}(k,l) = 0, k = 0,1,\ldots, i$$

- If a configuration for a corresponding $P_{O\_UE\_PUSCH, b,f,c}(j)$ value is provided by higher layers

- If a configuration for a corresponding $\alpha_{b,f,c}(j)$ value is provided by higher layers

- If $j > 1$ and the PUSCH transmission is scheduled by a DCI format 0_1 that includes a SRI field, and the UE is provided higher *SRI-PUSCH-PowerControl*, the UE determines the value of $l$ from the value of $j$ based on an indication by the SRI field for a *sri-PUSCH-PowerControlId* value associated with the *sri-P0-PUSCH-AlphaSetId* value corresponding to $j$ and with the *sri-PUSCH-ClosedLoopIndex* value corresponding to $l$

- If $j > 1$ and the PUSCH transmission is scheduled by a DCI format 0_0 or by a DCI format 0_1 that does not include a SRI field or the UE is not provided *SRI-PUSCH-PowerControl*, $l = 0$

- If $j = 1$, $l$ is provided by the value of *powerControlLoopToUse*

- $f_{b,f,c}(i,l) = \delta_{PUSCH, b,f,c}(i,l)$ is the PUSCH power control adjustment state for active UL BWP $b$ of carrier $f$ of serving cell $c$ and PUSCH transmission occasion $i$ if the UE is provided *tpc-Accumulation*, where

- $\delta_{PUSCH, b,f,c}$ absolute values are given in Table 7.1.1-1

- If the UE receives a random access response message in response to a PRACH transmission on active UL BWP $b$ of carrier $f$ of serving cell $c$ as desctibed in subcaluse 8

- $f_{b,f,c}(0,l) = \Delta P_{rampup,b,f,c} + \delta_{msg\ 2,b,f,c}$, where $l = 0$ and

- $\delta_{msg\ 2,b,f,c}$ is a TPC command value indicated in the random access response grant of the random access response message corresponding to the PRACH transmission on active UL BWP $b$ of carrier $f$ in the serving cell $c$, and $$\Delta P_{rampup,b,f,c} = \min\left\{\max\left\{0, P_{CMAX,f,c} - \left(\begin{array}{l}10\log_{10}(2^\mu \cdot M^{PUSCH}_{RB,b,f,c}(0)) \\ + P_{O\_PUSCH,b,f,c}(0) + \alpha_{b,f,c}(0) \cdot PL_c \\ + \Delta_{TF,b,f,c}(0) + \delta_{msg\ 2,b,f,c}\end{array}\right)\right\}\right\}, \Delta P_{rampuprequested,b,f,c}$$

and $\Delta P_{rampuprequested,b,f,c}$ is provided by higher layers and corresponds to the total power ramp-up requested by higher layers from the first to the last random access preamble for carrier $f$ in the serving cell $c$, $M^{PUSCH}_{RB,b,f,c}(0)$ is the bandwidth of the PUSCH resource assignment expressed in number of resource blocks for the first PUSCH transmission on active UL BWP $b$ of carrier $f$ of serving cell $c$, and $\Delta_{TF,b,f,c}(0)$ is the power adjustment of first PUSCH transmission on active UL BWP $b$ of carrier $f$ of serving cell $c$.

Table 7.1.1-1: Mapping of TPC Command Field in DCI format 0_0, DCI format 0_1, or DCI format 2_2, with CRC scrambled by TPC-PUSCH-RNTI, or DCI format 2_3, to absolute and accumulated $\delta_{PUSCH,b,f,c}$ values or $\delta_{SRS,b,f,c}$ values

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | -1 | -4 |
| 1 | 0 | -1 |
| 2 | 1 | 1 |
| 3 | 3 | 4 |

TABLE 2 ----------------------------------------------------------------------------------

If a UE transmits a PUCCH on active UL BWP $b$ of carrier $f$ in the primary cell $c$ using PUCCH power control adjustment state with index $l$, the UE determines the PUCCH transmission power $P_{PUCCH,b,f,c}(i,q_u,q_d,l)$ in PUCCH transmission occasion $i$ as $$P_{PUCCH,b,f,c}(i,q_u,q_d,l) = \min \begin{cases} P_{CMAX,f,c}(i), \\ P_{O\_PUCCH,b,f,c}(q_u) + 10\log_{10}(2^\mu \cdot M^{PUCCH}_{RB,b,f,c}(i)) + PL_{b,f,c}(q_d) + \Delta_{F\_PUCCH}(F) + \Delta_{TF,b,f,c}(i) + g_{b,f,c}(i,l) \end{cases}$$

[dBm]

where

- $P_{CMAX,f,c}(i)$ is the UE configured maximum output power defined in [8-1, TS 38.101-1], [8-2, TS38.101-2] and [8-3, TS38.101-3] for carrier $f$ of serving cell $c$ in PUCCH transmission occasion $i$

- $P_{O\_PUCCH,b,f,c}(q_u)$ is a parameter composed of the sum of a component $P_{O\_NOMINAL\_PUCCH}$, provided by *p0-nominal*, or $P_{O\_NOMINAL\_PUCCH} = 0$ dBm if *p0-nominal* is not provided, for carrier $f$ of primary cell $c$ and, if provided, a component $P_{O\_UE\_PUCCH}(q_u)$ provided by *p0-PUCCH-Value* in *P0-PUCCH* for active UL BWP $b$ of carrier $f$ of primary cell $c$, where $0 \leq q_u < Q_u$. $Q_u$ is a size for a set of $P_{O\_UE\_PUCCH}$ values provided by *maxNrofPUCCH-P0-PerSet*. The set of $P_{O\_UE\_PUCCH}$ values is provided by *p0-Set*. If *p0-Set* is not provided to the UE, $P_{O\_UE\_PUCCH}(q_u) = 0$, $0 \leq q_u < Q_u$

- If the UE is provided *PUCCH-SpatialRelationInfo*, the UE obtains a mapping, by an index provided by *p0-PUCCH-Id*, between a set of *pucch-SpatialRelationInfoId* values and a set of *p0-PUCCH-Value* values. If the UE is provided more than one values for *pucch-SpatialRelationInfoId* and the UE receives an activation command [11, TS 38.321] indicating a value of *pucch-SpatialRelationInfoId*, the UE determines the *p0-PUCCH-Value* value through the link to a corresponding *p0-PUCCH-Id* index. The UE applies the activation command 3 msec after a slot where the UE transmits HARQ-ACK information for the PDSCH providing the activation command

- If the UE is not provided *PUCCH-SpatialRelationInfo*, the UE obtains the *p0-PUCCH-Value* value from the *P0-PUCCH* with *p0-PUCCH-Id* value equal to 0 in *p0-Set*

- $M_{RB,b,f,c}^{PUCCH}(i)$ is a bandwidth of the PUCCH resource assignment expressed in number of resource blocks for PUCCH transmission occasion $i$ on active UL BWP $b$ of carrier $f$ of serving cell $c$ and $\mu$ is a SCS configuration defined in [4, TS 38.211]

- $PL_{b,f,c}(q_d)$ is a downlink pathloss estimate in dB calculated by the UE using RS resource index $q_d$ as described in Subclause 7.1.1 for the active DL BWP of carrier $f$ of the primary cell $c$ as described in Subcluase 12

- If the UE is not provided *pathlossReferenceRSs* or before the UE is provided dedicated higher layer parameters, the UE calculates $PL_{b,f,c}(q_d)$ using a RS resource obtained from the SS/PBCH block that the UE uses to obtain *MIB*

- If the UE is provided a number of RS resource indexes, the UE calculates $PL_{b,f,c}(q_d)$ using RS resource with index $q_d$, where $0 \le q_d < Q_d$. $Q_d$ is a size for a set of RS resources provided by *maxNrofPUCCH-PathlossReferenceRSs*. The set of RS resources is provided by *pathlossReferenceRSs*. The set of RS resources can include one or both of a set of SS/PBCH block indexes, each provided by *ssb-Index* in *PUCCH-PathlossReferenceRS* when a value of a corresponding *pucch-PathlossReferenceRS-Id* maps to a SS/PBCH block index, and a set of CSI-RS resource indexes, each provided by *csi-RS-Index* when a value of a corresponding *pucch-PathlossReferenceRS-Id* maps to a CSI-RS resource index. The UE identifies a RS resource in the set of RS resources to correspond either to a SS/PBCH block index or to a CSI-RS resource index as provided by *pucch-PathlossReferenceRS-Id* in *PUCCH-PathlossReferenceRS*

- If the UE is provided *pathlossReferenceRSs* and *PUCCH-SpatialRelationInfo*, the UE obtains a mapping, by indexes provided by corresponding values of *pucch-PathlossReferenceRS-Id*, between a set of *pucch-SpatialRelationInfoId* values and a set of *referencesignal* values provided by *PUCCH-PathlossReferenceRS*. If the UE is provided more than one values for *pucch-SpatialRelationInfoId* and the UE receives an activation command [11, TS 38.321] indicating a value of *pucch-SpatialRelationInfoId*, the UE determines the *referencesignal* value in *PUCCH-PathlossReferenceRS* through the link to a corresponding *pucch-PathlossReferenceRS-Id* index. The UE applies the activation command 3 msec after a slot where the UE transmits HARQ-ACK information for the PDSCH providing the activation command

- If *PUCCH-SpatialRelationInfo* includes *servingCellId* indicating a serving cell, the UE receives the RS for resource index $q_d$ on the active DL BWP of the serving cell

- If the UE is provided *pathlossReferenceRSs* and is not provided *PUCCH-SpatialRelationInfo*, the UE obtains the *referencesignal* value in *PUCCH-PathlossReferenceRS* from the *pucch-PathlossReferenceRS-Id* with index 0 in *PUCCH-PathlossReferenceRS* where the RS resource is either on a same serving cell or, if provided, on a serving cell indicated by a value of *pathlossReferenceLinking*

- The parameter $\Delta_{F\_PUCCH}(F)$ is provided by *deltaF-PUCCH-f0* for PUCCH format 0, *deltaF-PUCCH-f1* for PUCCH format 1, *deltaF-PUCCH-f2* for PUCCH format 2, *deltaF-PUCCH-f3* for PUCCH format 3, and *deltaF-PUCCH-f4* for PUCCH format 4

- $\Delta_{TF,b,f,c}(i)$ is a PUCCH transmission power adjustment component on active UL BWP $b$ of carrier $f$ of primary cell $c$

- For a PUCCH transmission using PUCCH format 0 or PUCCH format 1, $$\Delta_{TF,b,f,c}(i) = 10 \log_{10}\left(\frac{N_{ref}^{PUCCH}}{N_{symb}^{PUCCH}(i)}\right) + \Delta_{UCI}(i) \quad \text{where}$$

- $N_{symb}^{PUCCH}(i)$ is a number of PUCCH format 0 symbols or PUCCH format 1 symbols included in a PUCCH resource of a PUCCH resource set indicated by a value of a PUCCH resource indicator field in DCI format 1_0 or DCI format 1_1, or provided by *nrofSymbols* in *PUCCH-format0* or in *PUCCH-format1* respectively

- $N_{ref}^{PUCCH} = 2$ for PUCCH format 0

- $N_{ref}^{PUCCH} = N_{symb}^{slot}$ for PUCCH format 1

- $\Delta_{UCI}(i) = 0$ for PUCCH format 0

- $\Delta_{UCI}(i) = 10 \log_{10}(O_{UCI}(i))$ for PUCCH format 1, where $O_{UCI}(i)$ is a number of UCI bits in PUCCH transmission occasion $i$

- For a PUCCH transmission using PUCCH format 2 or PUCCH format 3 or PUCCH format 4 and for a number of UCI bits smaller than or equal to 11, $\Delta_{TF,b,f,c}(i) = 10 \log_{10}\left(K_1 \cdot \left(n_{HARQ\text{-}ACK}(i) + O_{SR}(i) + O_{CSI}(i)\right)/N_{RE}(i)\right)$, where

- $K_1 = 6$

- $n_{HARQ\text{-}ACK}(i)$ is a number of HARQ-ACK information bits that the UE determines as described in Subclause 9.1.2.1 for Type-1 HARQ-ACK codebook and as described in Subclause 9.1.3.1 for Type-2 HARQ-ACK codebook. If the UE is not provided with *pdsch-HARQ-ACK-Codebook*, $n_{HARQ\text{-}ACK}(i) = 1$ if the UE includes a HARQ-ACK information bit in the PUCCH transmission; otherwise, $n_{HARQ\text{-}ACK}(i) = 0$

- $O_{SR}(i)$ is a number of SR information bits that the UE determines as described in Subclause 9.2.5.1

- $O_{CSI}(i)$ is a number of CSI information bits that the UE determines as described in Subclause 9.2.5.2

- $N_{RE}(i)$ is a number of resource elements determined as $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ is a number of subcarriers per resource block excluding subcarriers used for DM-RS transmission, and $N_{symb\text{-}UCI,b,f,c}^{PUCCH}(i)$ is a number of symbols excluding symbols used for DM-RS transmission, as defined in Subclause 9.2.5.2, for PUCCH transmission occasion $i$ on active UL BWP $b$ of carrier $f$ of serving cell $c$

- For a PUCCH transmission using PUCCH format 2 or PUCCH format 3 or PUCCH format 4 and for a number of UCI bits larger than 11, $\Delta_{TF,b,f,c}(i) = 10 \log_{10}\left(2^{K_2 \cdot BPRE(i)} - 1\right)$, where

- $K_2 = 2.4$

- $\text{BPRE}(i) = (O_{ACK}(i) + O_{SR}(i) + O_{CSI}(i) + O_{CRC}(i))/N_{RE}(i)$

- $O_{ACK}(i)$ is a number of HARQ-ACK information bits that the UE determines as described in Subclause 9.1.2.1 for Type-1 HARQ-ACK codebook and as described in Subclause 9.1.3.1 for Type-2 HARQ-ACK codebook. If the UE is not provided *pdsch-HARQ-ACK-Codebook*, $O_{ACK} = 1$ if the UE includes a HARQ-ACK information bit in the PUCCH transmission; otherwise, $O_{ACK} = 0$

- $O_{SR}(i)$ is a number of SR information bits that the UE determines as described in Subclause 9.2.5.1

- $O_{CSI}(i)$ is a number of CSI information bits that the UE determines as described in Subclause 9.2.5.2

- $O_{CRC}(i)$ is a number of CRC bits that the UE determines as described in Subclause 9.2.5

- $N_{RE}(i)$ is a number of resource elements that the UE determines as $N_{RE}(i) = M_{RB,b,f,c}^{PUCCH}(i) \cdot N_{sc,ctrl}^{RB}(i) \cdot N_{symb\text{-}UCI,b,f,c}^{PUCCH}(i)$, where $N_{sc,ctrl}^{RB}(i)$ is a number of subcarriers per resource block excluding subcarriers used for DM-RS transmission, and $N_{symb\text{-}UCI,b,f,c}^{PUCCH}(i)$ is a number of symbols excluding symbols used for DM-RS transmission, as defined in Subclause 9.2.5.2, for PUCCH transmission occasion $i$ on active UL BWP $b$ of carrier $f$ of serving cell $c$.

- For the PUCCH power control adjustment state $g_{b,f,c}(i,l)$ for active UL BWP $b$ of carrier $f$ of primary cell $c$ and PUCCH transmission occasion $i$

- $\delta_{PUCCH,b,f,c}(i,l)$ is a TPC command value and is included in a DCI format 1_0 or DCI format 1_1 for active UL BWP $b$ of carrier $f$ of the primary cell $c$ that the UE detects for PUCCH transmission occasion $i$ or is jointly coded with other TPC commands in a DCI format 2_2 with CRC scrambled by TPC-PUCCH-RNTI [5, TS 36.212], as described in Subclause 11.3

- $l \in \{0,1\}$ if the UE is provided *twoPUCCH-PC-AdjustmentStates* and *PUCCH-SpatialRelationInfo* and $l = 0$ if the UE is not provided *twoPUCCH-PC-AdjustmentStates* or *PUCCH-SpatialRelationInfo*

- If the UE obtains a TPC command value from a DCI format 1_0 or a DCI format 1_1 and if the UE is provided *PUCCH-SpatialRelationInfo*, the UE obtains a mapping, by an index provided by *p0-PUCCH-Id*, between a set of *pucch-SpatialRelationInfoId* values and a set of values for *closedLoopIndex* that provide the $l$ value(s). If the UE receives an activation command indicating a value of *pucch-SpatialRelationInfoId*, the UE determines the value *closedLoopIndex* that provides the value of $l$ through the link to a corresponding *p0-PUCCH-Id* index

- If the UE obtains one TPC command from a DCI format 2_2 with CRC scrambled by a TPC-PUCCH-RNTI, the $l$ value is provided by the closed loop indicator field in DCI format 2_2

- $g_{b,f,c}(i,l) = g_{b,f,c}(i - i_0, l) + \sum_{m=0}^{C(C_i)-1} \delta_{\text{PUCCH}, b,f,c}(m,l)$ is the current PUCCH power control adjustment state $l$ for active UL BWP $b$ of carrier $f$ of serving cell $c$ and PUCCH transmission occasion $i$, where

- The $\delta_{\text{PUCCH}, b,f,c}$ values are given in Table 7.1.2-1

- $\sum_{m=0}^{C(C_i)-1} \delta_{\text{PUCCH}, b,f,c}(m,l)$ is a sum of TPC command values in a set $C_i$ of TPC command values with cardinality $C(C_i)$ that the UE receives between $K_{\text{PUCCH}}(i - i_0) - 1$ symbols before PUCCH transmission occasion $i - i_0$ and $K_{\text{PUCCH}}(i)$ symbols before PUCCH transmission occasion $i$ on active UL BWP $b$ of carrier $f$ of serving cell $c$ for PUCCH power control adjustment state, where $i_0 > 0$ is the smallest integer for which $K_{\text{PUCCH}}(i - i_0)$ symbols before PUCCH transmission occasion $i - i_0$ is earlier than $K_{\text{PUCCH}}(i)$ symbols before PUCCH transmission occasion $i$

- If the PUCCH transmission is in response to a detection by the UE of a DCI format 1_0 or DCI format 1_1, $K_{PUCCH}(i)$ is a number of symbols for active UL BWP $b$ of carrier $f$ of serving cell $c$ after a last symbol of a corresponding PDCCH reception and before a first symbol of the PUCCH transmission

- If the PUCCH transmission is not in response to a detection by the UE of a DCI format 1_0 or DCI format 1_1, $K_{PUCCH}(i)$ is a number of $K_{PUCCH,min}$ symbols equal to the product of a number of symbols per slot, $N_{symb}^{slot}$, and the minimum of the values provided by *k2* in *PUSCH-ConfigCommon* for active UL BWP $b$ of carrier $f$ of serving cell $c$

- If the UE has reached maximum power for active UL BWP $b$ of carrier $f$ of primary cell $c$ at PUCCH transmission occasion $i - i_0$ and $$\sum_{m=0}^{C(C_i)-1} \delta_{PUCCH, b,f,c}(m,l) \geq 0 \text{, then } g_{b,f,c}(i,l) = g_{b,f,c}(i-i_0,l)$$

- If UE has reached minimum power for active UL BWP $b$ of carrier $f$ of primary cell $c$ at PUCCH transmission occasion $i - i_0$ and $$\sum_{m=0}^{C(C_i)-1} \delta_{PUCCH, b,f,c}(m,l) \leq 0 \text{, then } g_{b,f,c}(i,l) = g_{b,f,c}(i-i_0,l)$$

- If a configuration of a $P_{O\_PUCCH, b,f,c}(q_u)$ value for a corresponding PUCCH power control adjustment state $l$ for active UL BWP $b$ of carrier $f$ of serving cell $c$ is provided by higher layers,

- $g_{b,f,c}(k,l) = 0, k = 0,1,...,i$

If the UE is provided *PUCCH-SpatialRelationInfo*, the UE determines the value of $l$ from the value of $q_u$ based on a *pucch-SpatialRelationInfoId* value associated with the *p0-PUCCH-Id* value corresponding to $q_u$ and with the *closedLoopIndex* value corresponding to $l$; otherwise, $l = 0$

- Else,

- $g_{b,f,c}(0,l) = \Delta P_{rampup,b,f,c} + \delta_{b,f,c}$, where $l = 0$, and $\delta_{b,f,c}$ is the TPC command value indicated in a random access response grant corresponding to a PRACH transmission or is the TPC command value in a DCI format with CRC scrambled by C-RNTI or MCS-C-RNTI that the UE detects in a first PDCCH reception in a search space set provided by *recoverySearchSpaceId* if the PUCCH transmission is a first PUCCH transmission after 28 symbols from a last symbol of the first PDCCH reception, and, if the UE transmits PUCCH on active UL BWP $b$ of carrier $f$ of serving cell $c$, $$\Delta P_{rampup,b,f,c} = \min \left[ \begin{array}{l} \max \left( \begin{array}{l} 0, \\ P_{CMAX,f,c} - (P_{O\_PUCCH,b,f,c} + PL_{b,f,c}(q_d) + \Delta_{F\_PUCCH}(F) + \Delta_{TF,b,f,c} + \delta_{b,f,c}) \end{array} \right) \\ \Delta P_{rampuprequested,b,f,c} \end{array} \right]$$

;

otherwise, $$\Delta P_{rampup,b,f,c} = \min \left[ \begin{array}{l} \max \left( \begin{array}{l} 0, \\ P_{CMAX,f,c} - (P_{O\_PUCCH,b,f,c} + PL_{b,f,c}(q_d)) \end{array} \right), \\ \Delta P_{rampuprequested,b,f,c} \end{array} \right]$$ where $\Delta P_{rampuprequested,b,f,c}$ is provided by higher layers and corresponds to the total power ramp-up requested by higher layers from the first to the last preamble for active UL BWP $b$ of carrier $f$ of primary cell $c$, and $\Delta_{F,PUCCH}(F)$ corresponds to PUCCH format 0 or PUCCH format 1

Table 7.2.1-1: Mapping of TPC Command Field in DCI format 1_0 or DCI format 1_1 or DCI format 2_2 with CRC scrambled by TPC-PUCCH-RNTI to accumulated $\delta_{PUCCH,b,f,c}$ values

| TPC Command Field | Accumulated $\delta_{PUCCH,b,f,c}$ [dB] |
|---|---|
| 0 | -1 |
| 1 | 0 |
| 2 | 1 |
| 3 | 3 |

CROSS REFERENCE

This Nonprovisional application claims priority under 35 U.S.C. § 119 on provisional Application No. 62/879,309 on Jul. 26, 2019, the entire contents of which are hereby incorporated by reference.

The invention claimed is:

1. An Integrated Access and Backhaul (IAB) node that communicates over a radio interface, the IAB node comprising:
    mobile-termination circuitry configured to transmit over the radio interface with a parent node;
    distribution circuitry configured to transmit over the radio interface with a child node; and
    processor circuitry configured to manage transmission power utilized by the IAB node by taking into consideration both the transmission by the mobile-termination circuitry and the transmission by the distribution circuitry,
    wherein the processor circuitry is further configured to determine the transmission power utilized by the IAB node by determining each of:
        power utilization by the mobile-termination circuitry for transmission on a Physical Uplink Shared Channel (PUSCH);
        power utilization by the mobile-termination circuitry for transmission on a Physical Uplink Control Channel (PUCCH);
        power utilization by the distribution circuitry for transmission on a Physical Downlink Shared Channel (PDSCH); and
        power utilization by the distribution circuitry for transmission on a Physical Downlink Control Channel (PDCCH).

2. The IAB node of claim 1, wherein the processor circuitry is further configured to generate a report of the transmission power utilized by the IAB node, and
    the mobile-termination circuitry is further configured to transmit the report of transmission power utilized by the IAB node to the parent node.

* * * * *